US007949963B1

(12) United States Patent
Pham et al.

(10) Patent No.: US 7,949,963 B1
(45) Date of Patent: *May 24, 2011

(54) 1-2-3 DYNAMIC ON-TOP TABULAR (DTT) WEB PAGE EDITING

(76) Inventors: Buu Tien Ton Pham, Westminister, CA (US); Dong Vu, Placentia, CA (US)

( * ) Notice: Subject to any disclaimer, the term of this patent is extended or adjusted under 35 U.S.C. 154(b) by 881 days.

This patent is subject to a terminal disclaimer.

(21) Appl. No.: 11/973,081

(22) Filed: Oct. 5, 2007

(51) Int. Cl.
*G06F 13/00* (2006.01)
*G06F 15/00* (2006.01)
(52) U.S. Cl. ........................................ 715/851; 715/853
(58) Field of Classification Search .......... 715/763–765, 715/851–855, 740–742, 810, 751–753, 754
See application file for complete search history.

(56) References Cited

U.S. PATENT DOCUMENTS

| 2008/0104542 A1* | 5/2008 | Cohen et al. ................. 715/810 |
| 2008/0162275 A1* | 7/2008 | Logan et al. ................... 705/12 |

* cited by examiner

*Primary Examiner* — Cao Nguyen
(74) *Attorney, Agent, or Firm* — Grant's Law Firm; Allan Grant

(57) ABSTRACT

A method and system for a user to consistently edit information on web pages at real-time. It starts with a authorize login for the said web pages. And then, the process of editing the select data can be done in 3 steps: First a user selects an option from an initial command menu, a tabular form is generated for said selected option; Second, said user inputs data in said tabular form, said user will then selects said option from a command menu on said tabular form; Third, wherein said user selects cancel from said command menu on said tabular form, said user will return back to the initial said command menu, or wherein said user selects submit option from said command menu on said tabular form, said server will store that data in to said data storage, said server will save the data as current data in the web control, said server will generate a new html document and post back onto said system with input data as view data, said system will render the new html document to said web page. Wherein said user elects to make additional changes to said web page, said process would be repeated by starting again at said initial command menu.

15 Claims, 29 Drawing Sheets

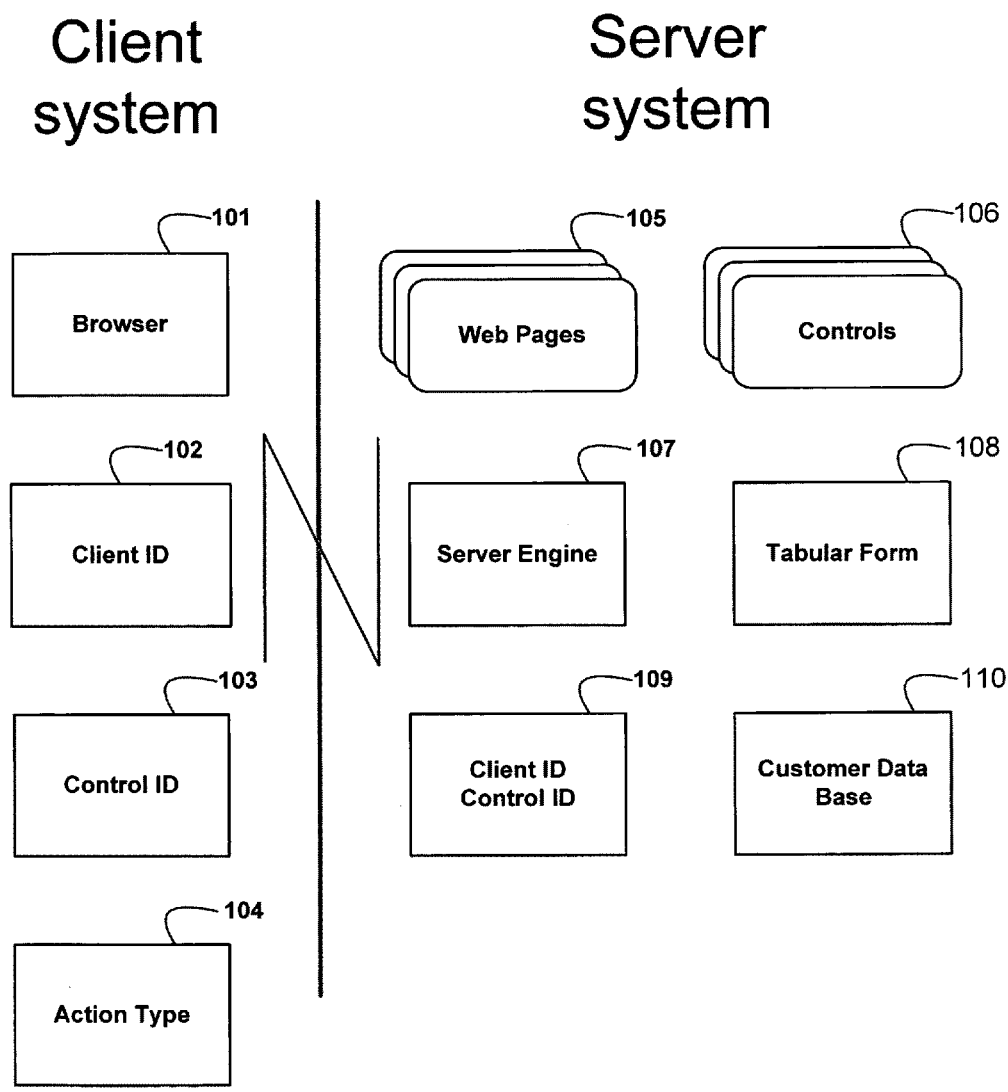
Figure 1. Block Diagram

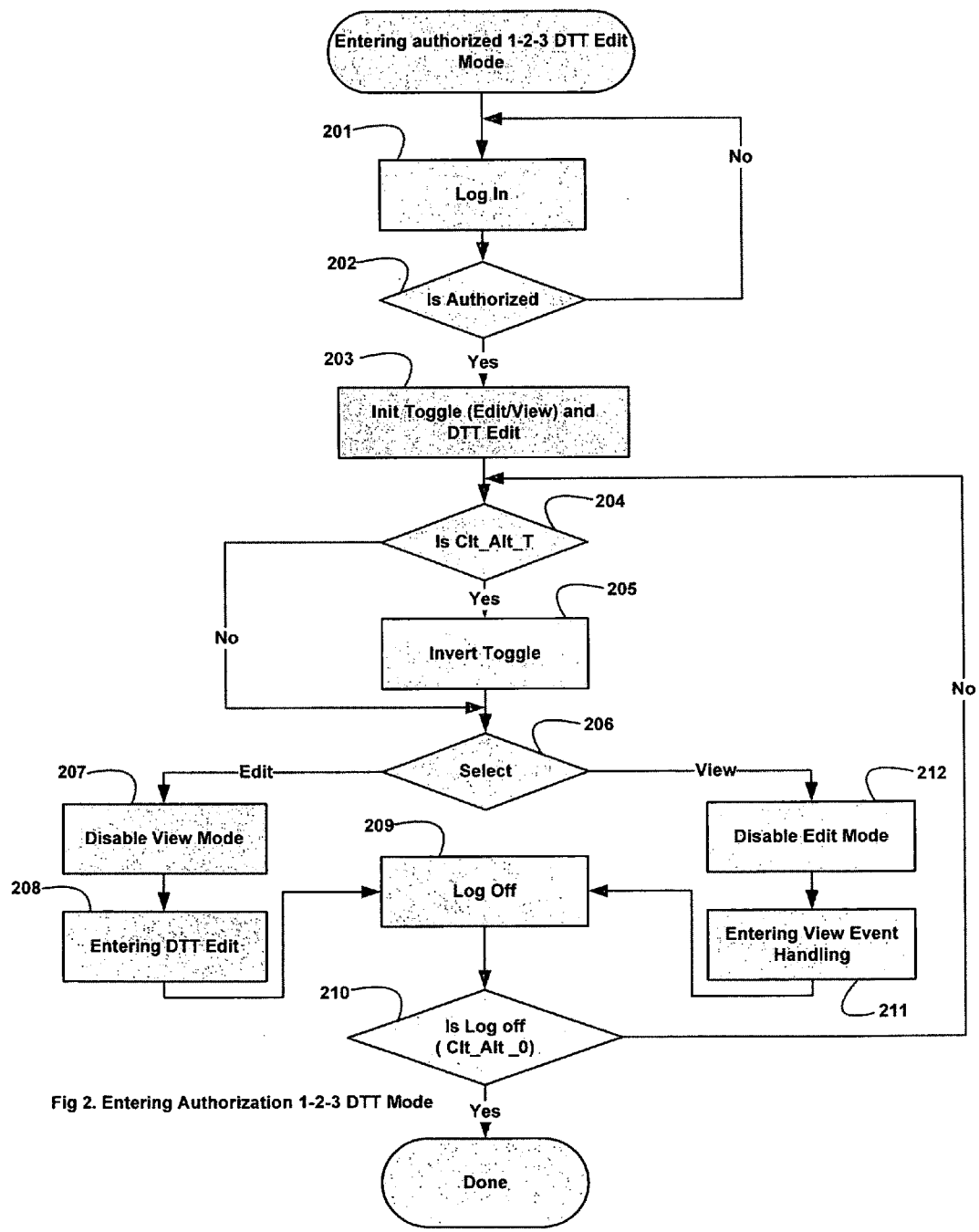
Fig 2. Entering Authorization 1-2-3 DTT Mode

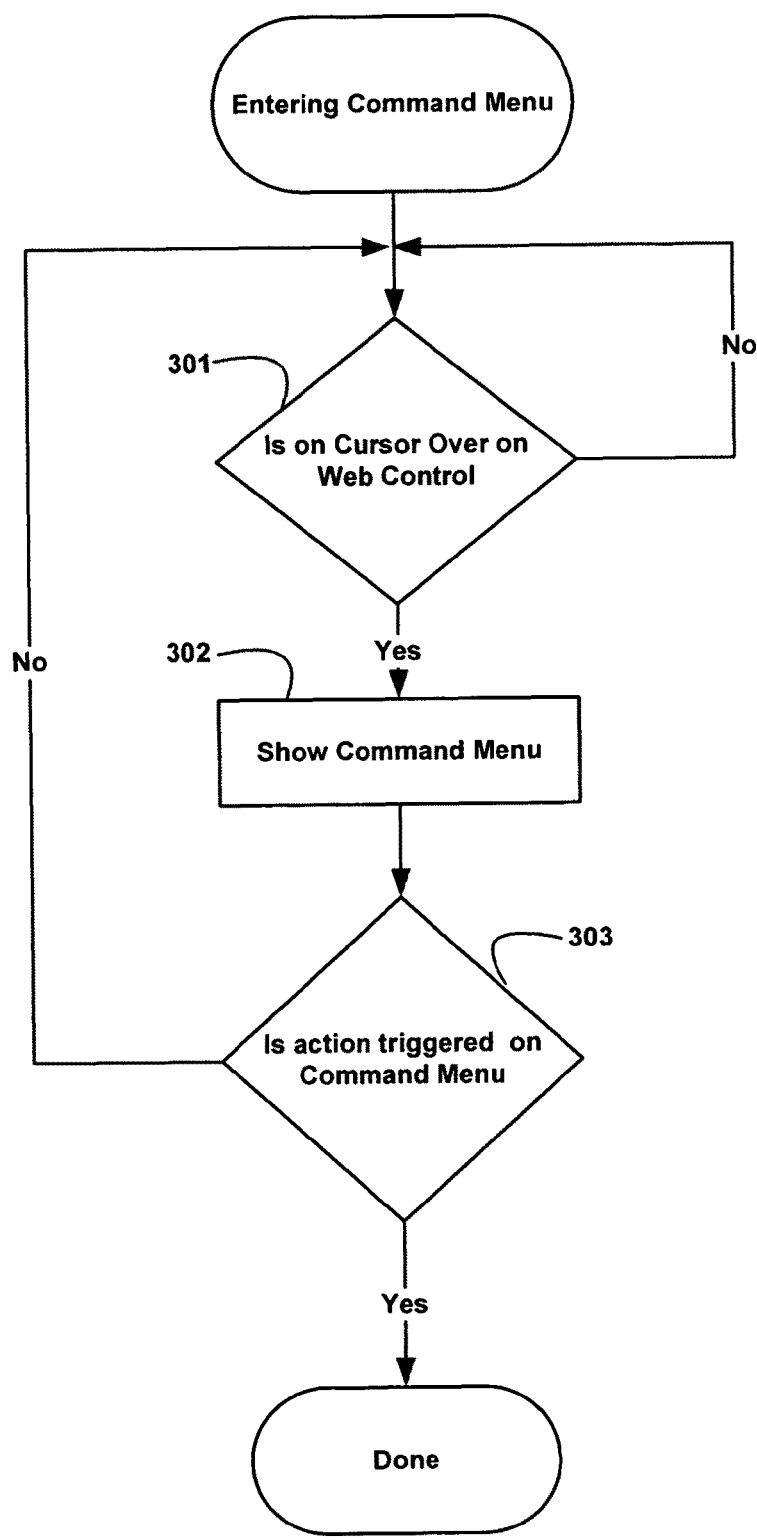
Figure 3 Handle actions on Command Menu

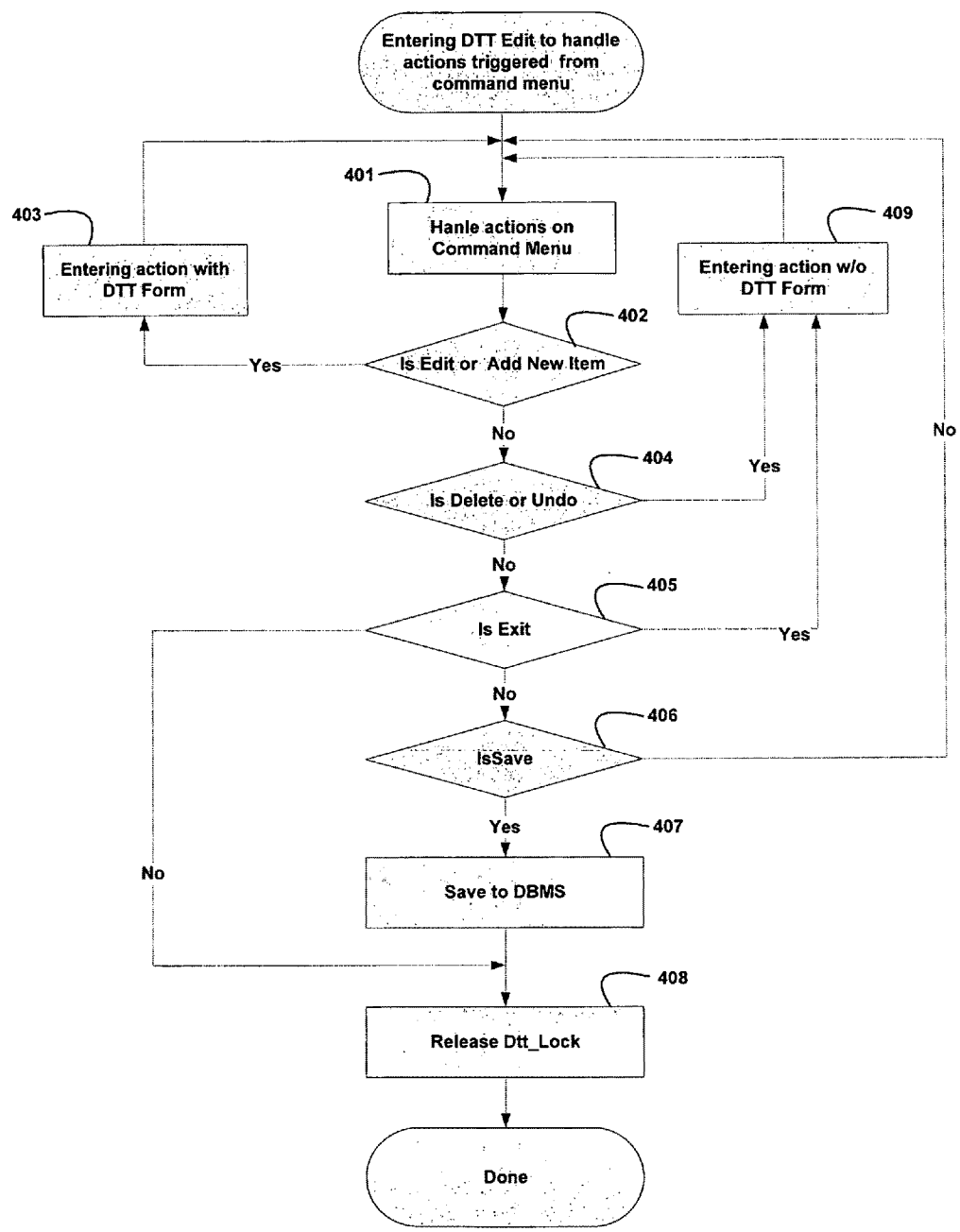
Figure 4. Entering DTT Edit

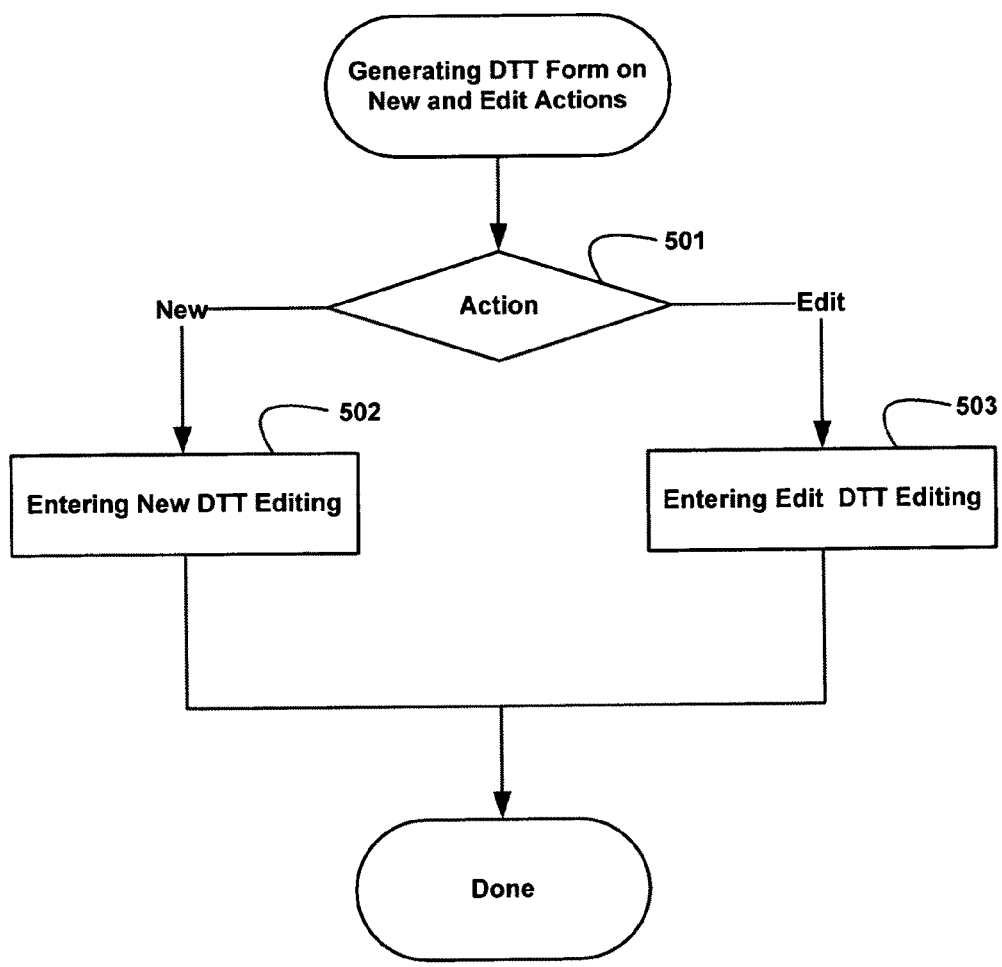
Fig 5. Entering DTT at new and edit action

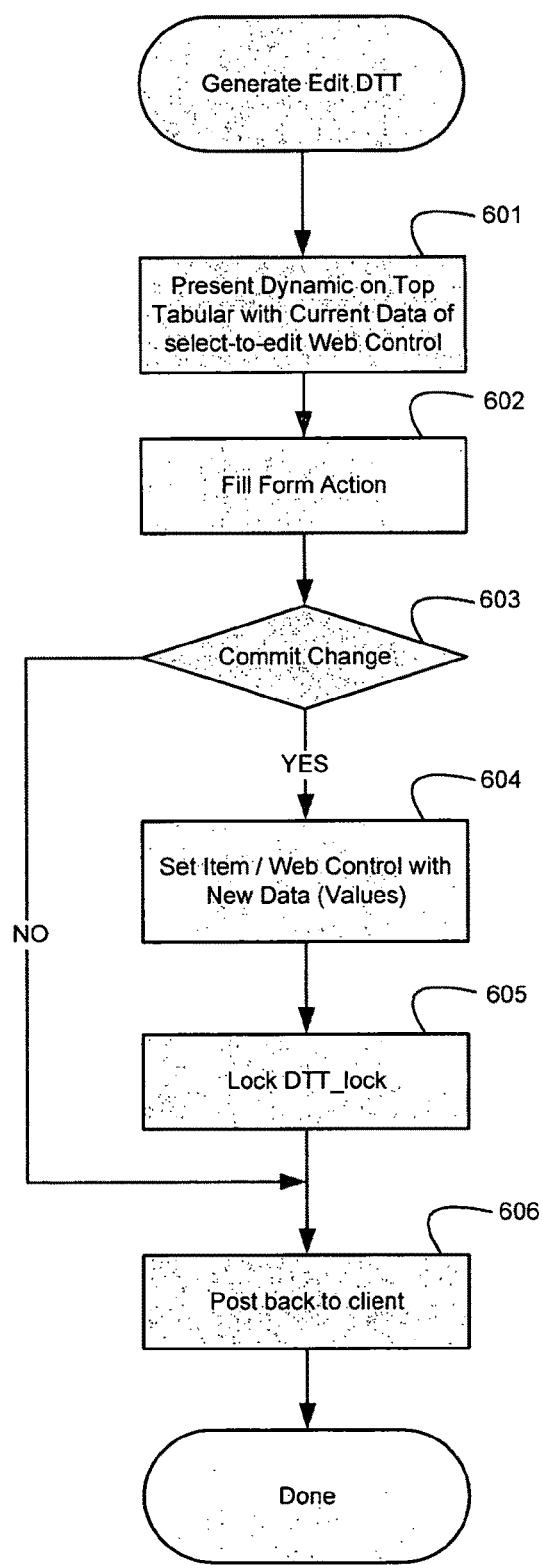
Fig 6. Edit DTT

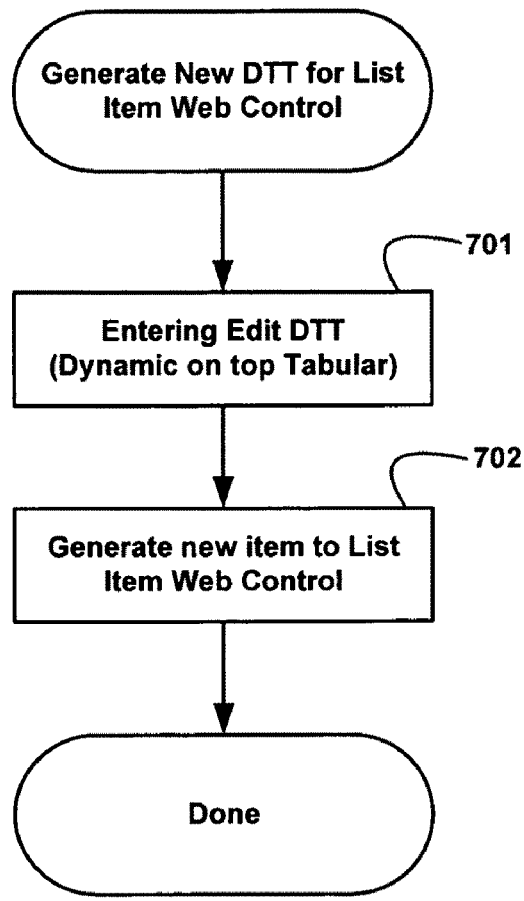
Fig 7. Generate New DTT for New Item on List Item Web Control

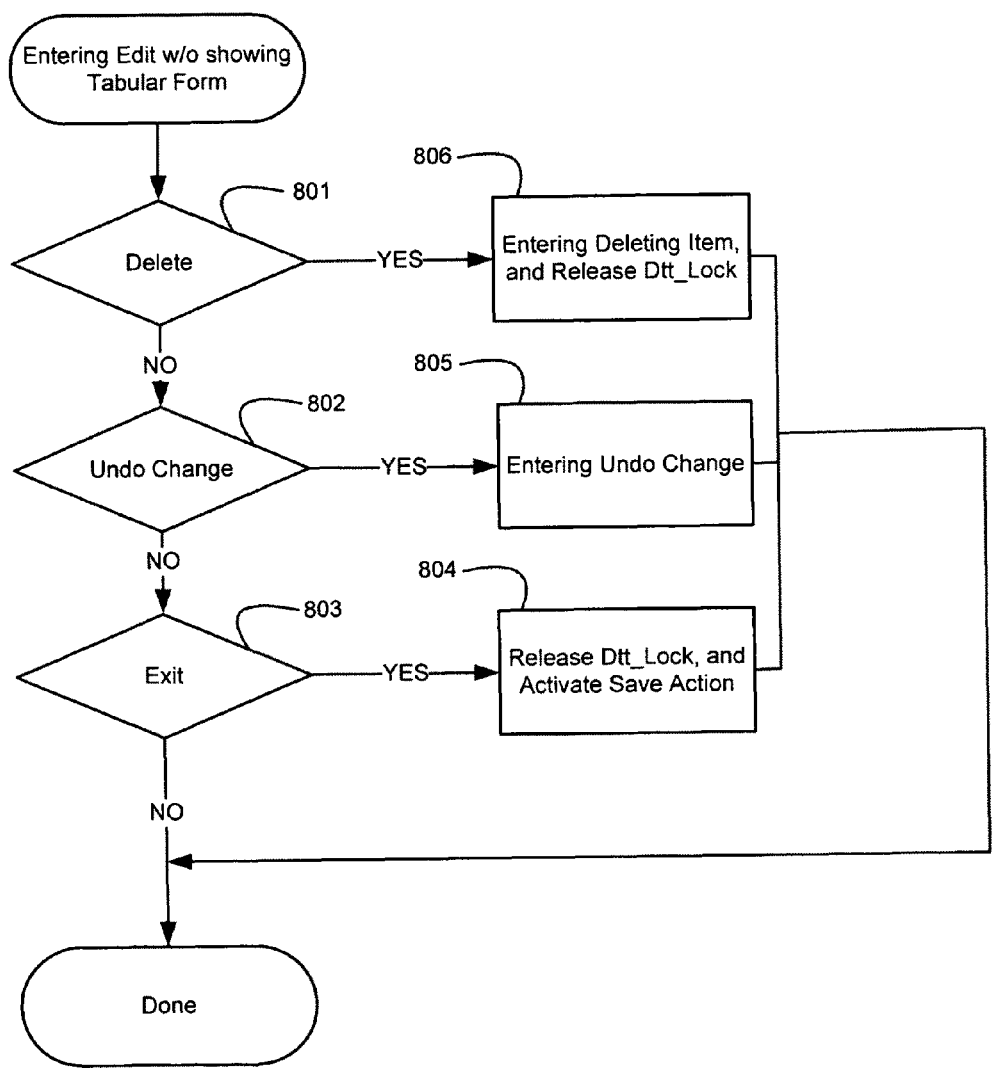
Fig 8. Edit DTT without showing Edit Tabular

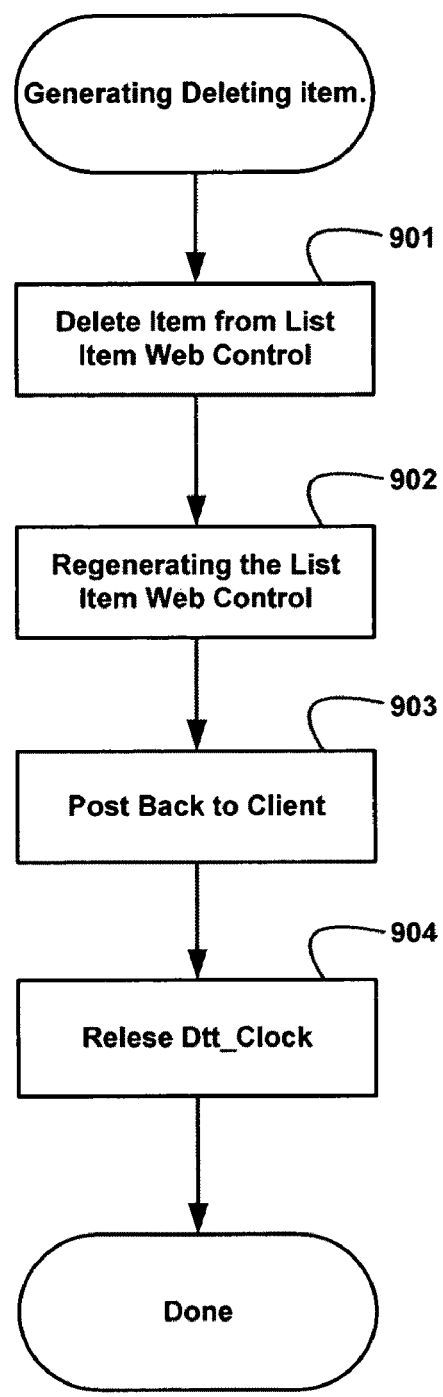
Fig 9. Deleting Item

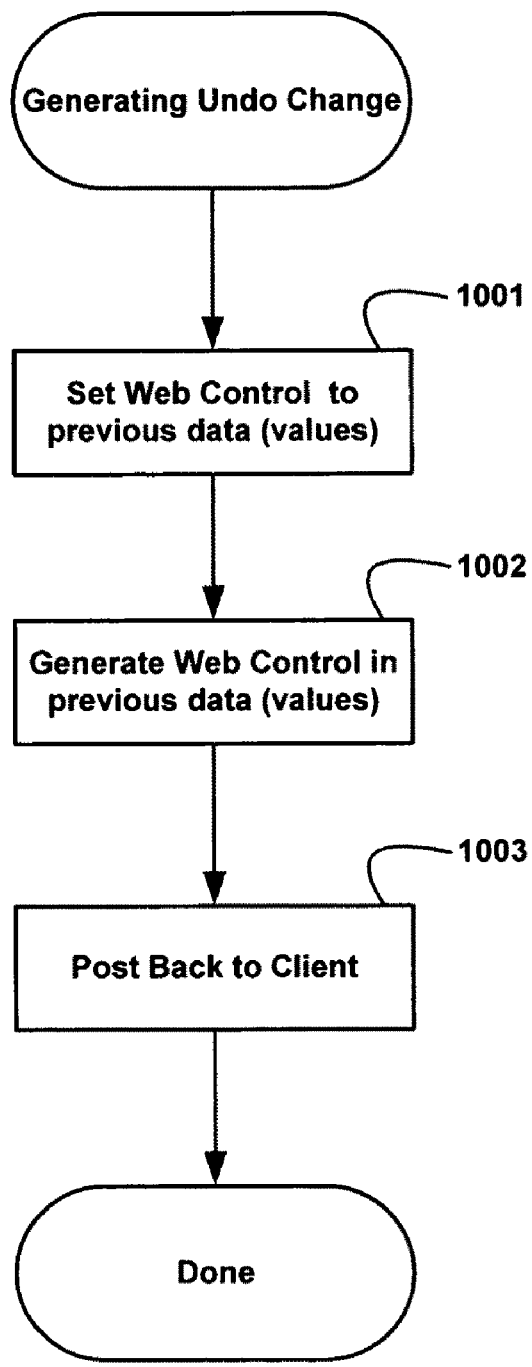
Fig 10. Undo Change

Start
A: Contact Info
B: Business Info
C: Status Listing
D: Services Listing
.
.

Fig 11A Display web control items at both view mode

A Contact Name    [          ]

A Contact Address [          ]

A. Contact Email  [          ]

A. Contact Phone  [          ]

[ Edit ] [ Print ] [ Save ] [ Undo ] [ Redo ] [ Exit ] [ Log out ]

B . Business Hour

C. Status Listing

D: Service Listing

Fig 11B Display Item A web control on Edit DTT

D. Service Name        [            ]

D. Service Description [            ]

D. Service Price       [            ]

D Service Type         [            ]

[ Edit ] [ Print ] [ Save ] [ Undo ] [ Redo ] [ Add ] [ Delete ] [ Exit ] [ Log out ]  Figure 12B Fig 11C Display Item D for List Item Web Control on Edit DTT A. Contact Name ☐

A. Contact Address ☐

A. Contact Email ☐

A. Contact Phone ☐

[ Submit ]  [ Cancel ]

Figure 11D General Tabular Form For Web Control A.

D.Service Name

D.Service Desc

D. Service Price

D. Servicce Type

[Submit]  [Cancel]

Figure 11E General Tabular Form For List Item Web Control D

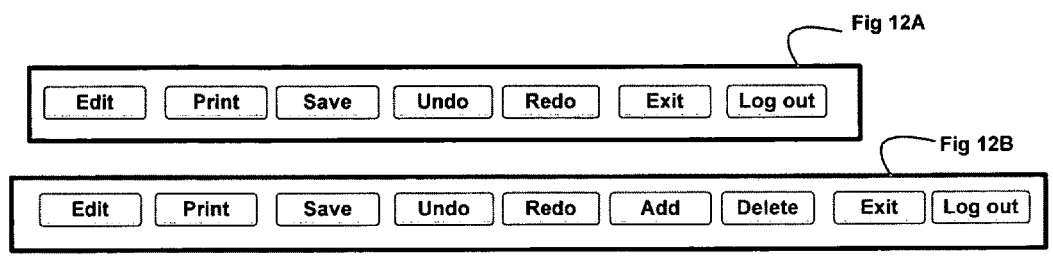
Figure 12 Typical Command Menu of 1-2-3 DTT Edit.

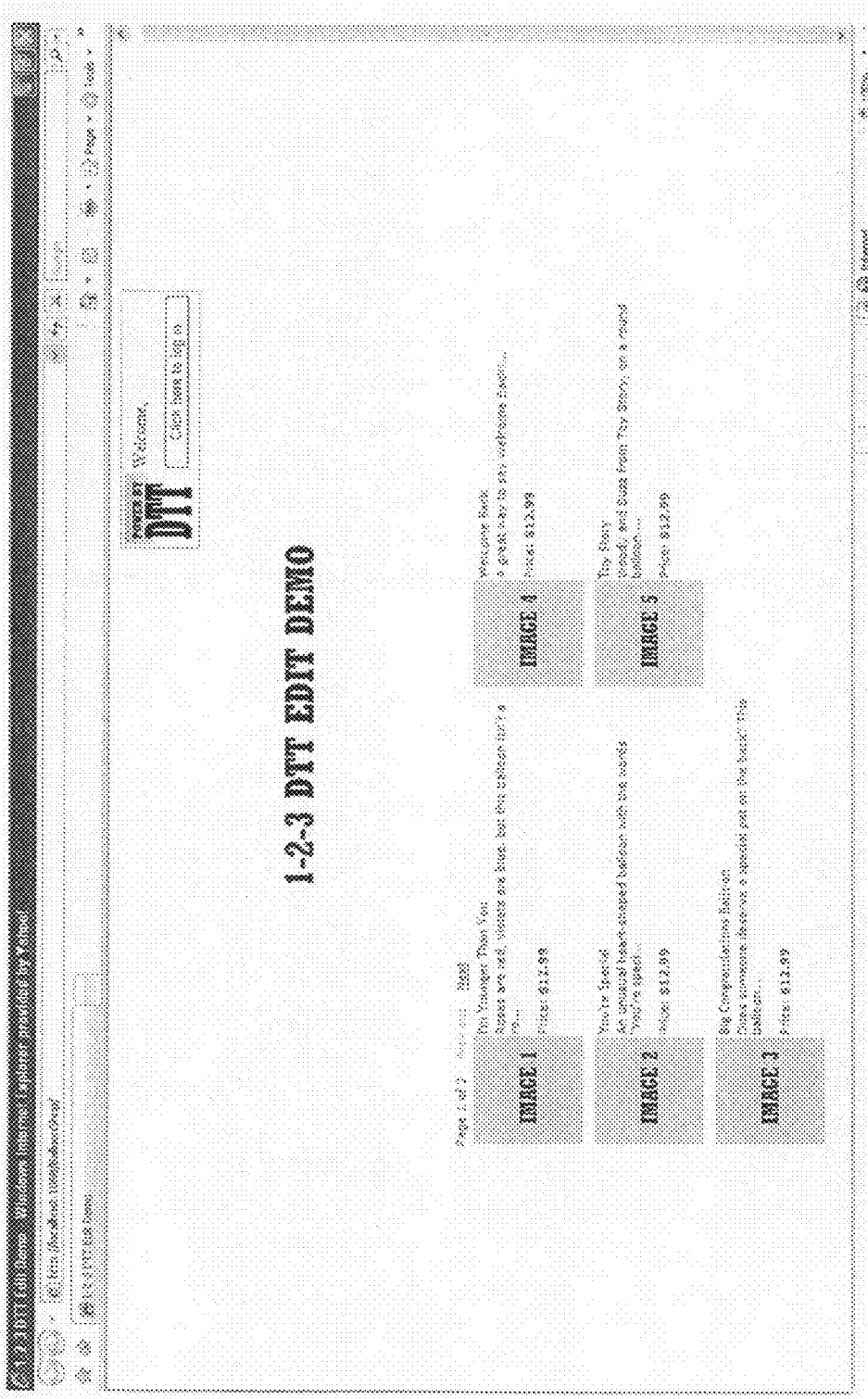

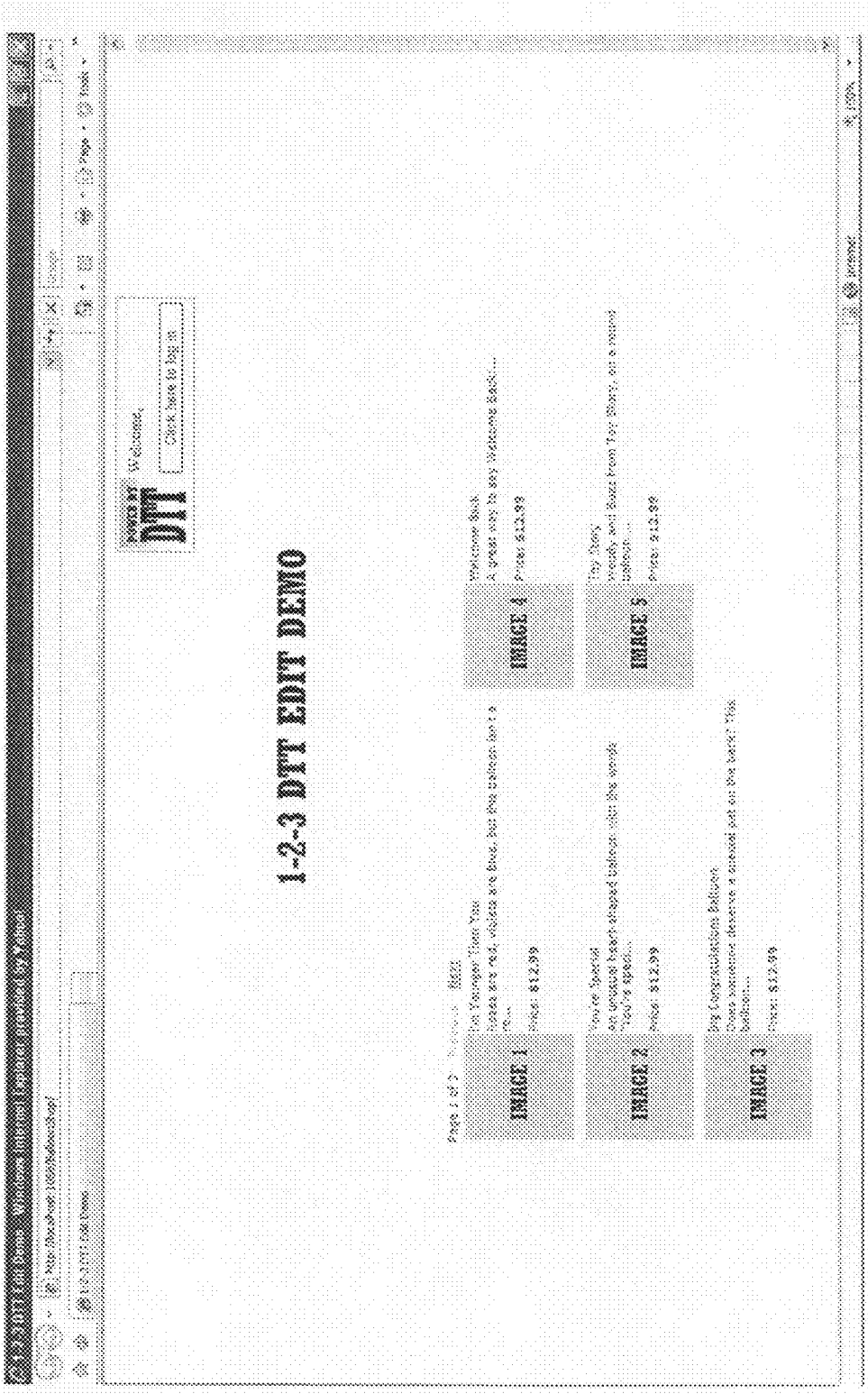

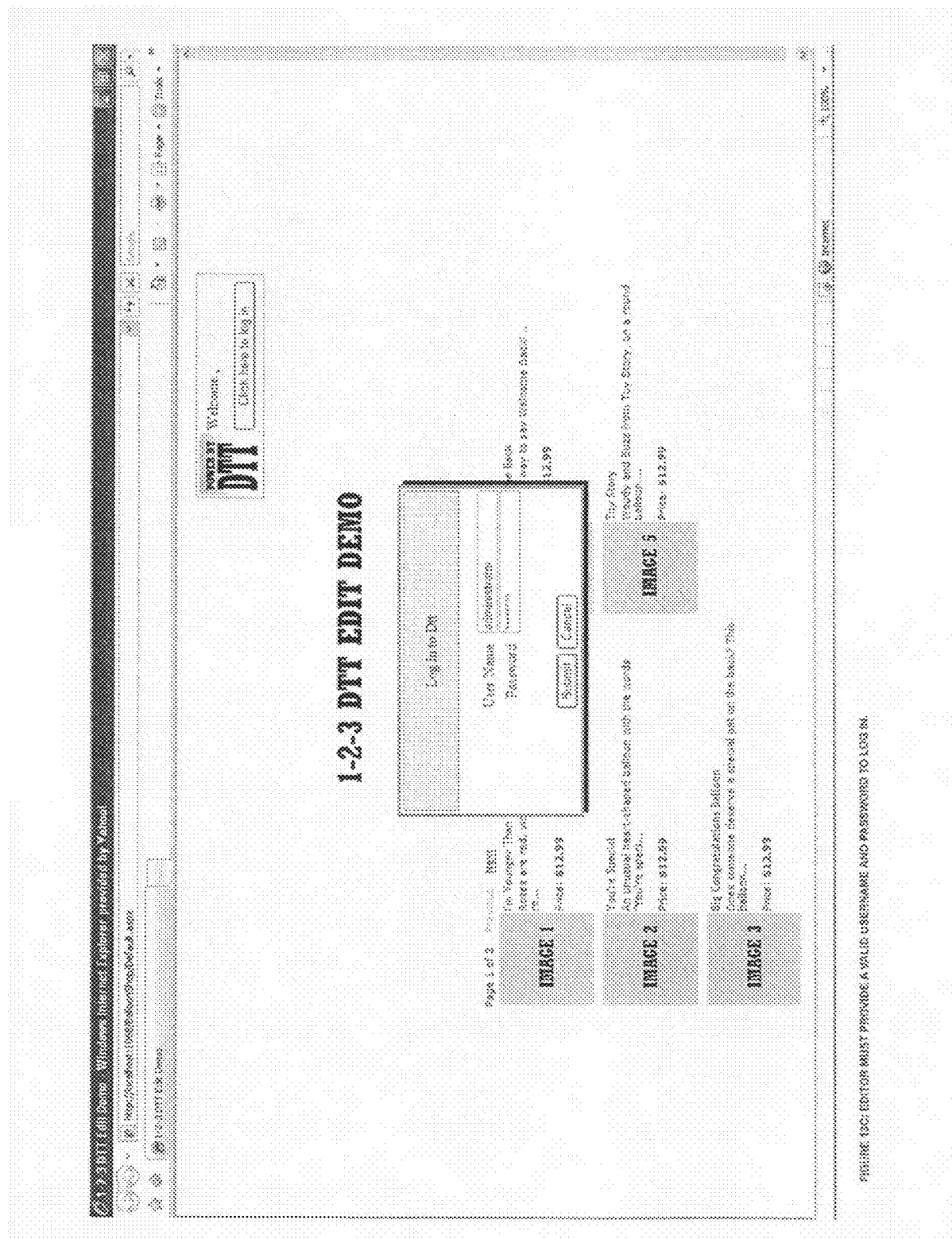
FIGURE 12C: EDITOR MUST PROVIDE A VALID USERNAME AND PASSWORD TO LOG IN.

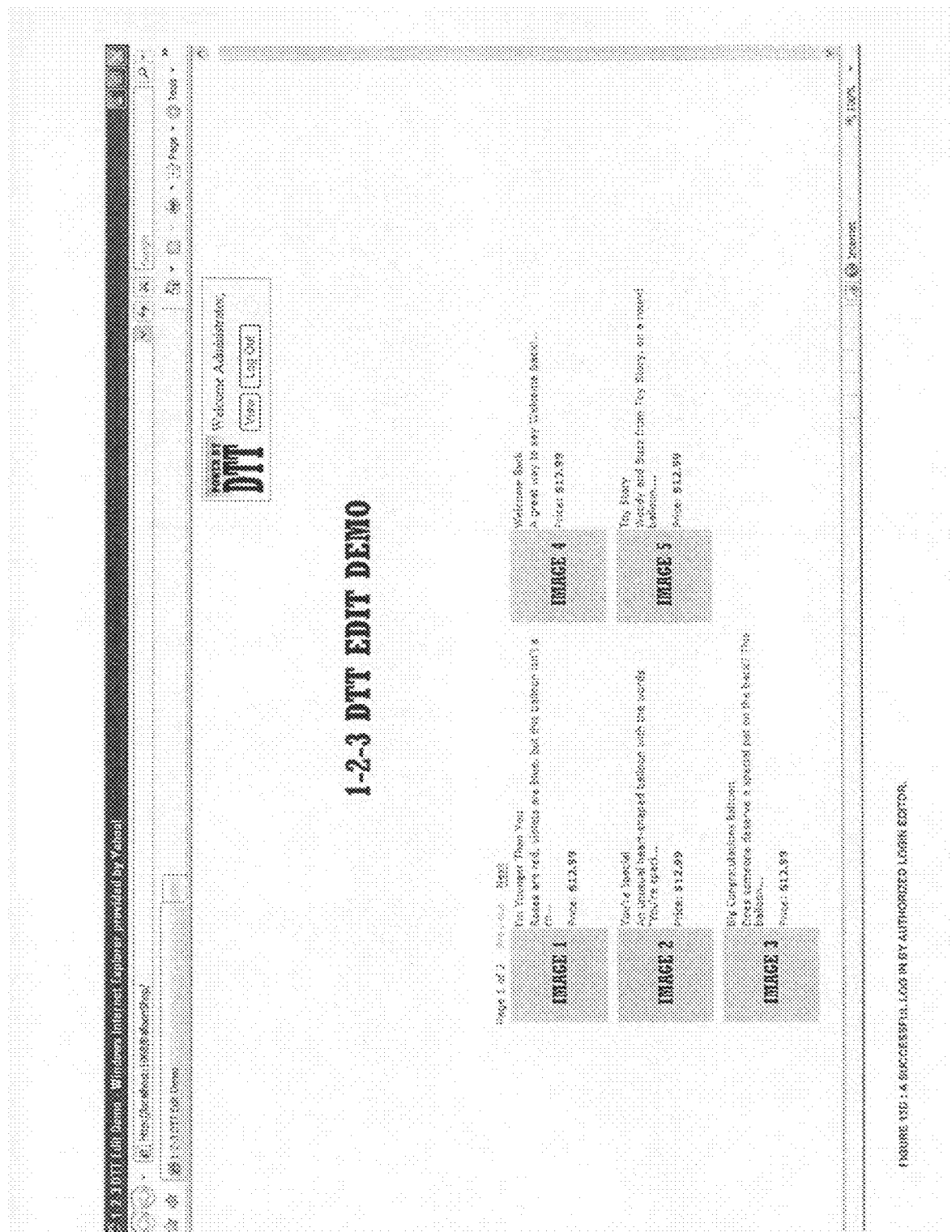

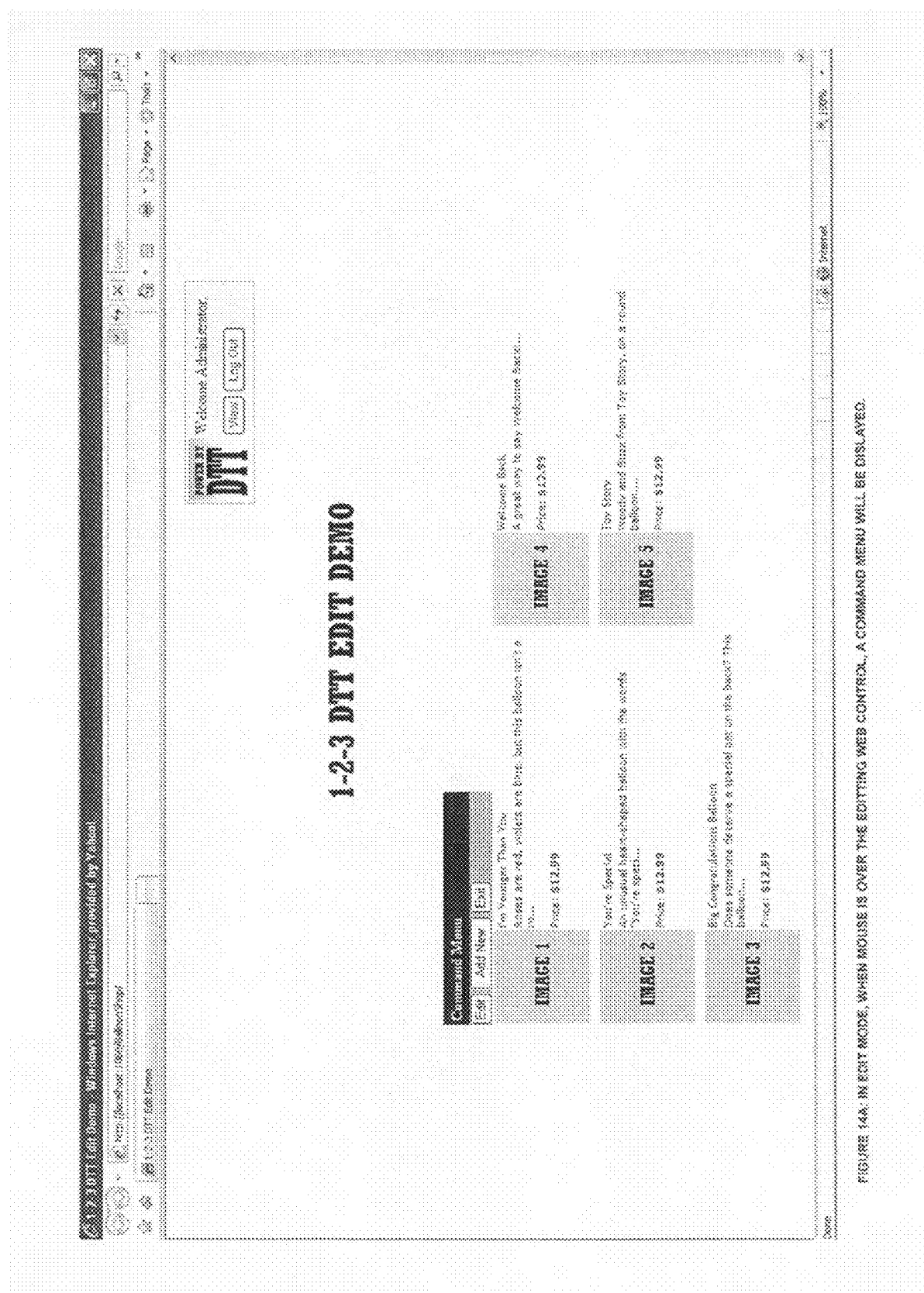
FIGURE 14A. IN EDIT MODE, WHEN MOUSE IS OVER THE EDITING WEB CONTROL, A COMMAND MENU WILL BE DISPLAYED.

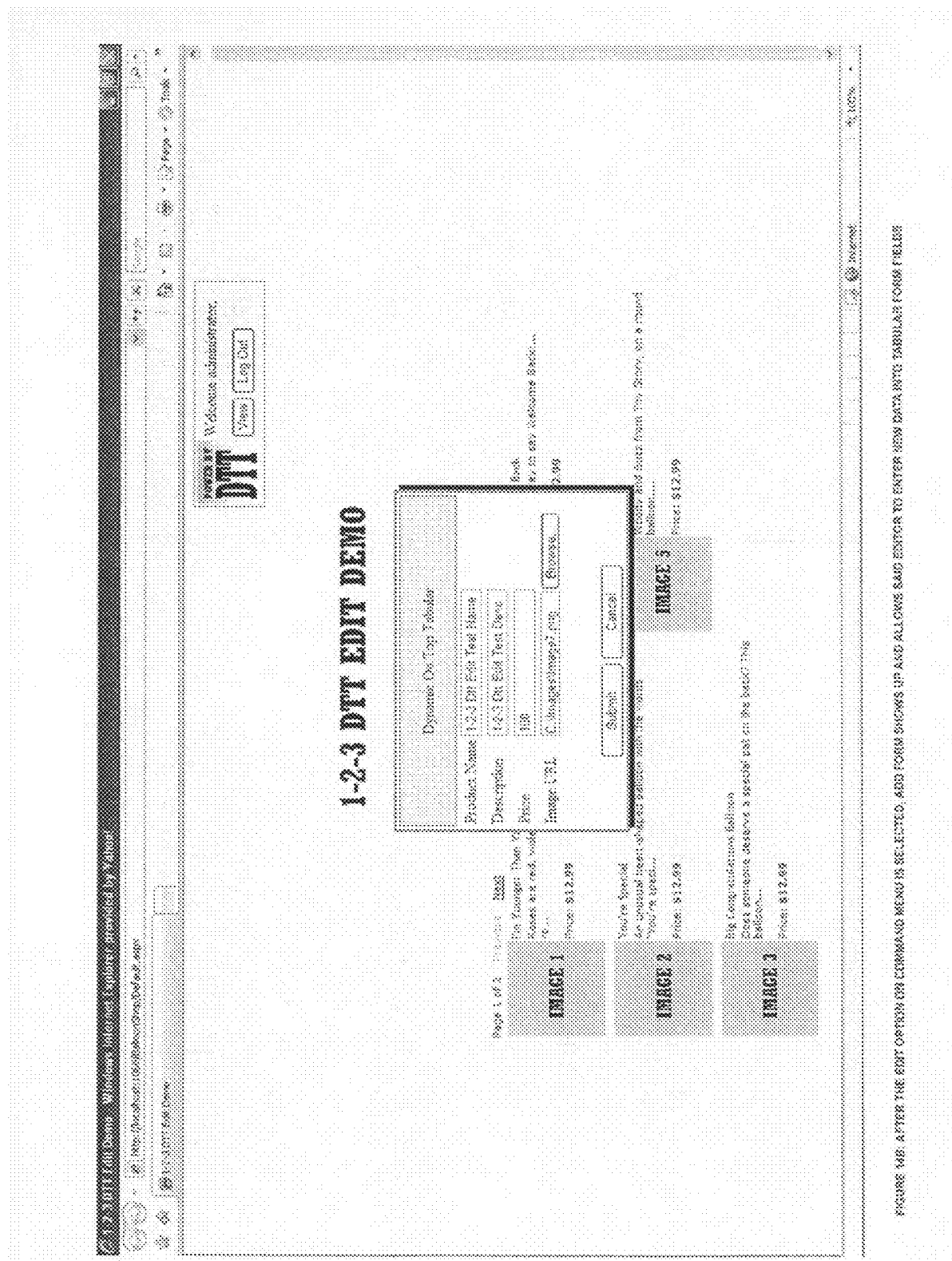

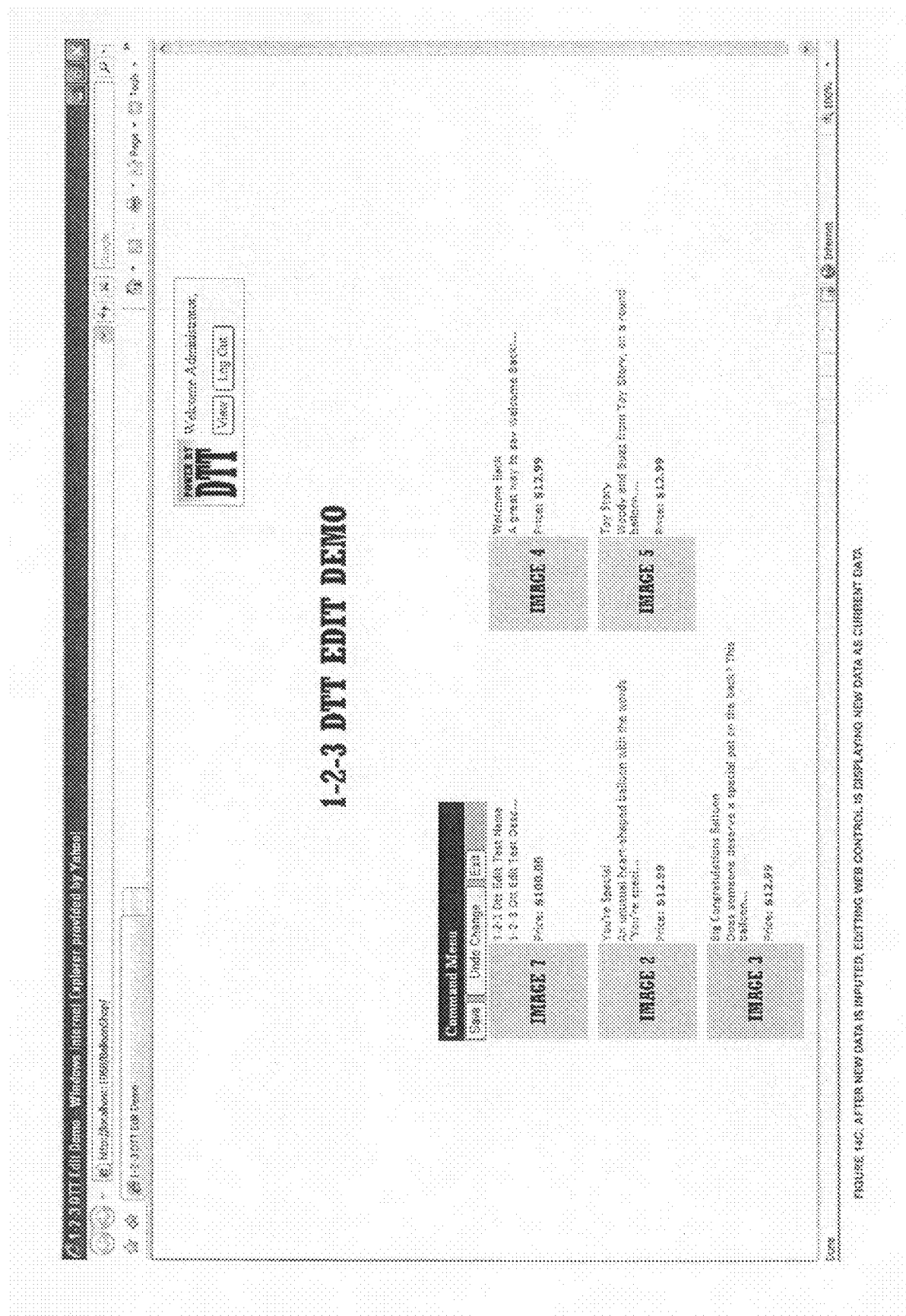
FIGURE 14C. AFTER NEW DATA IS INPUTTED, EDITING WEB CONTROL IS DISPLAYING NEW DATA AS CURRENT DATA.

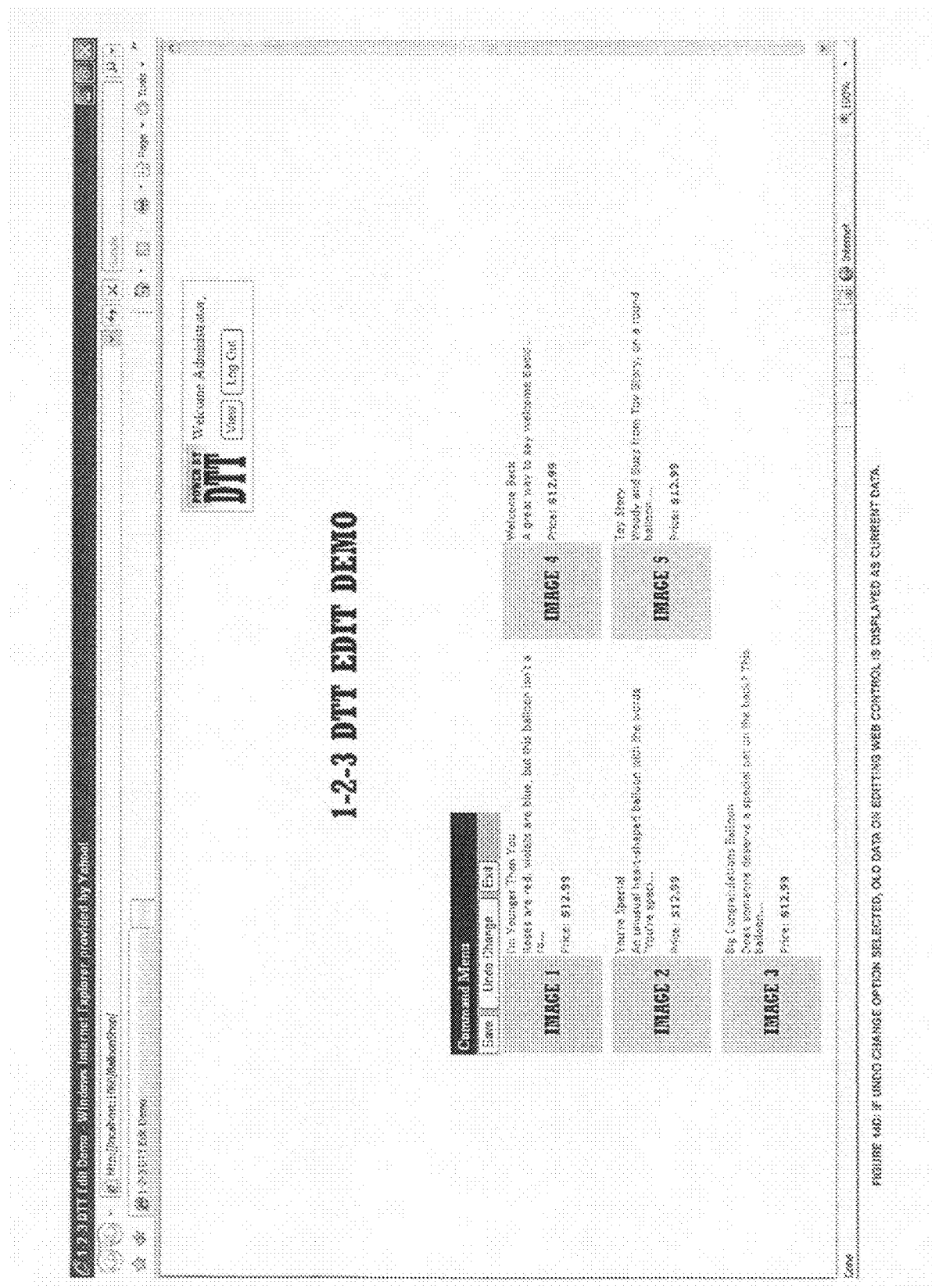

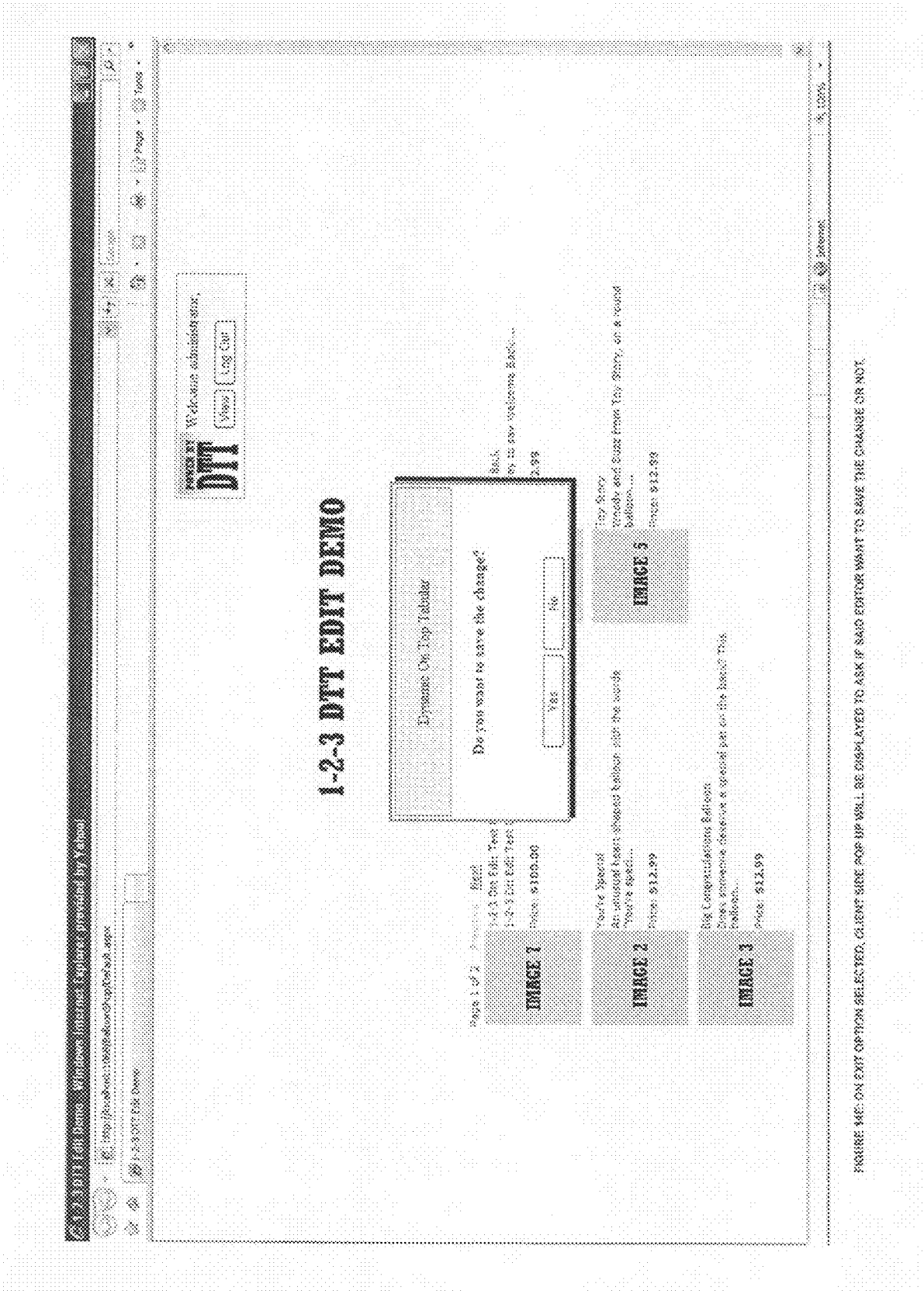

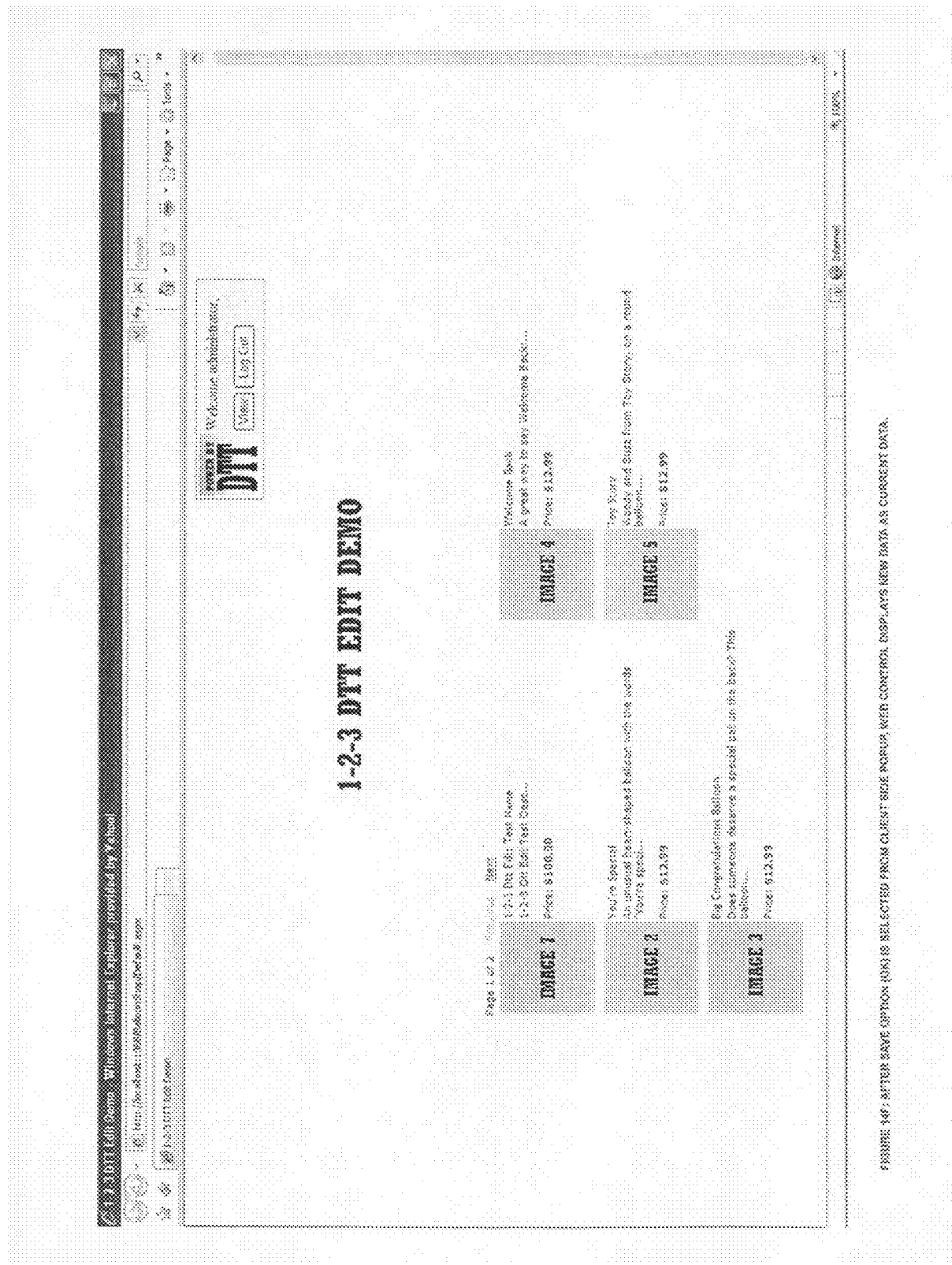

FIGURE 14G. WHEN SAVE OPTION SELECTED ON COMMAND MENU, NEW UPDATED DATA IS DISPLAYED CURRENT DATA.

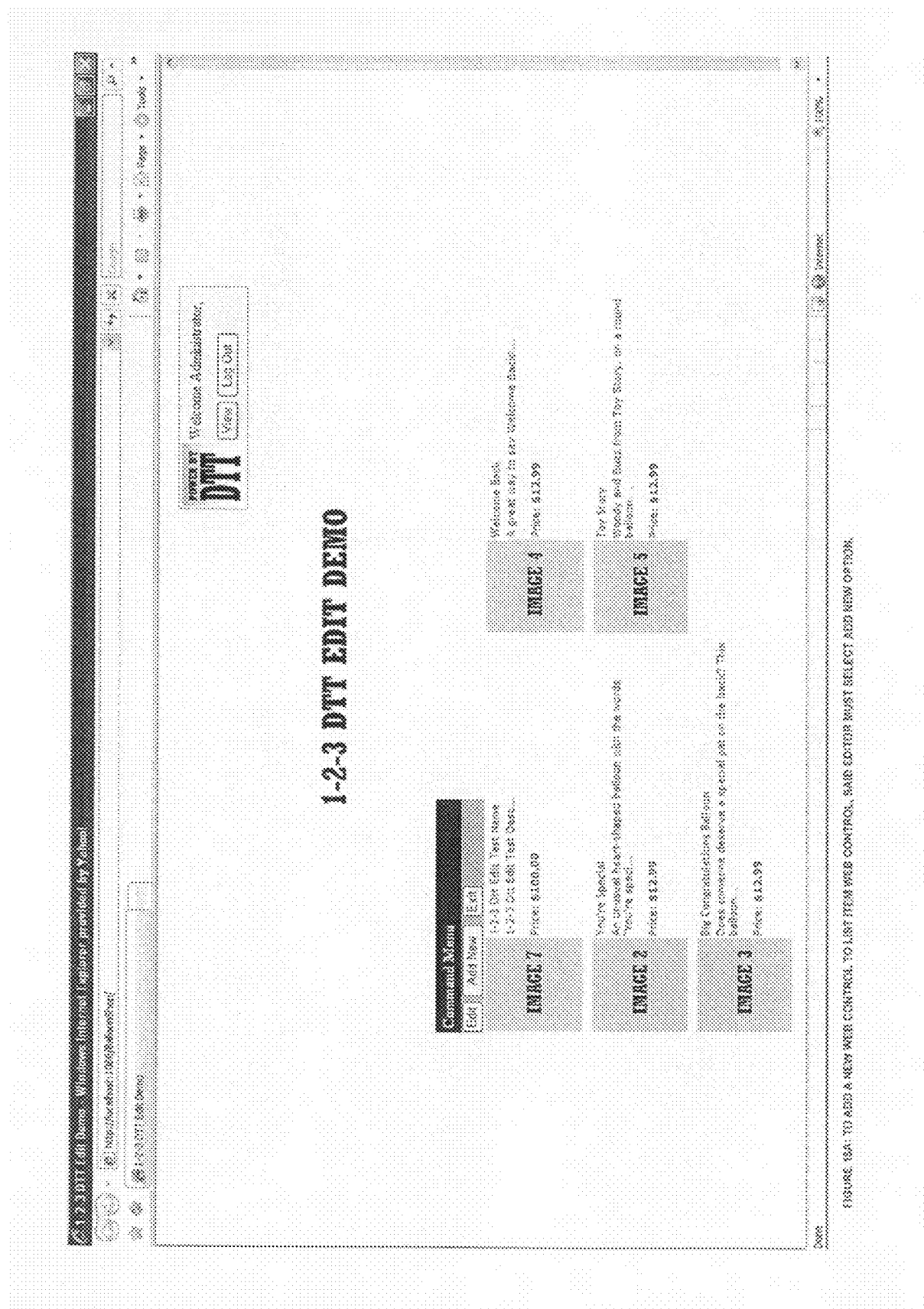

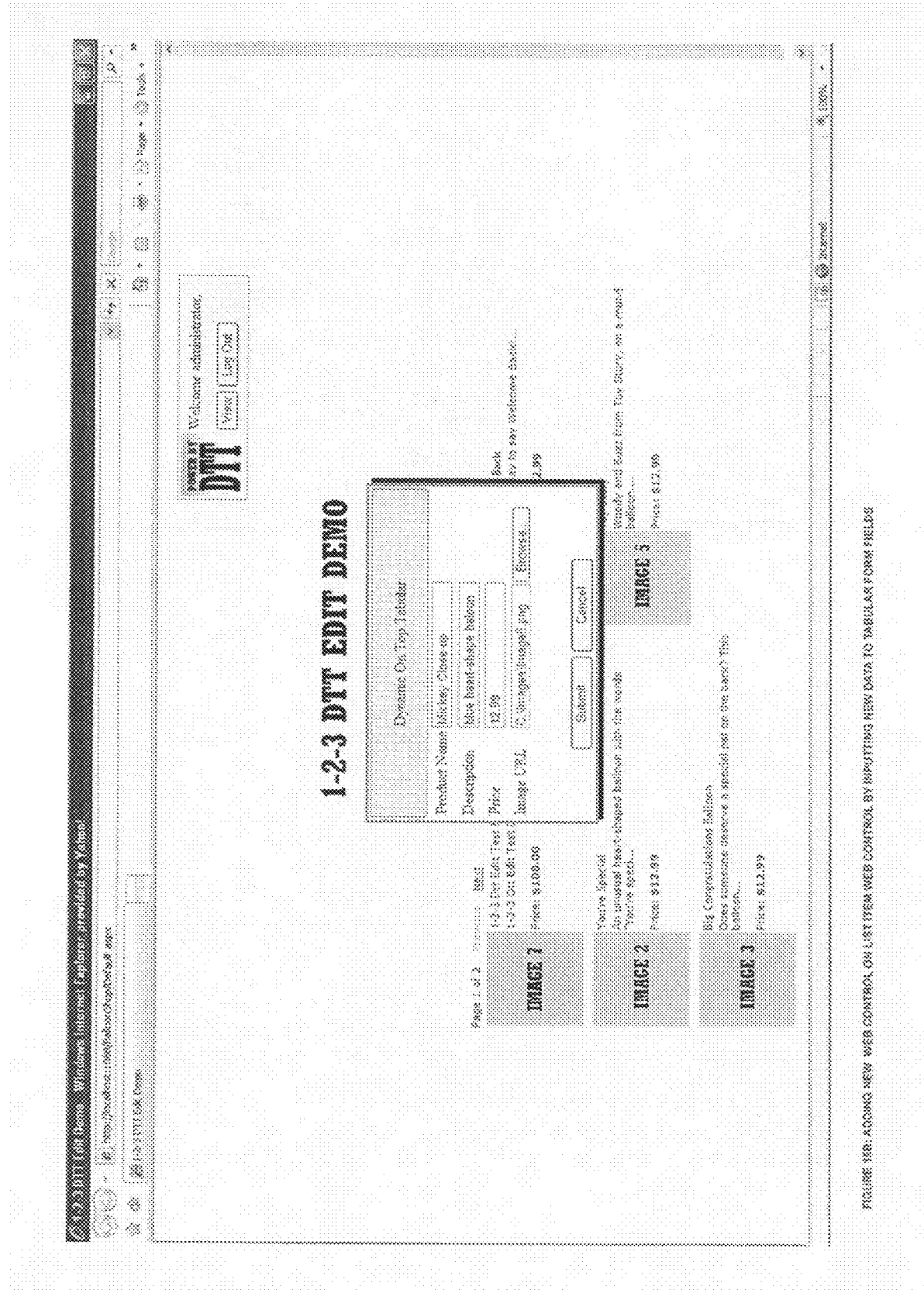

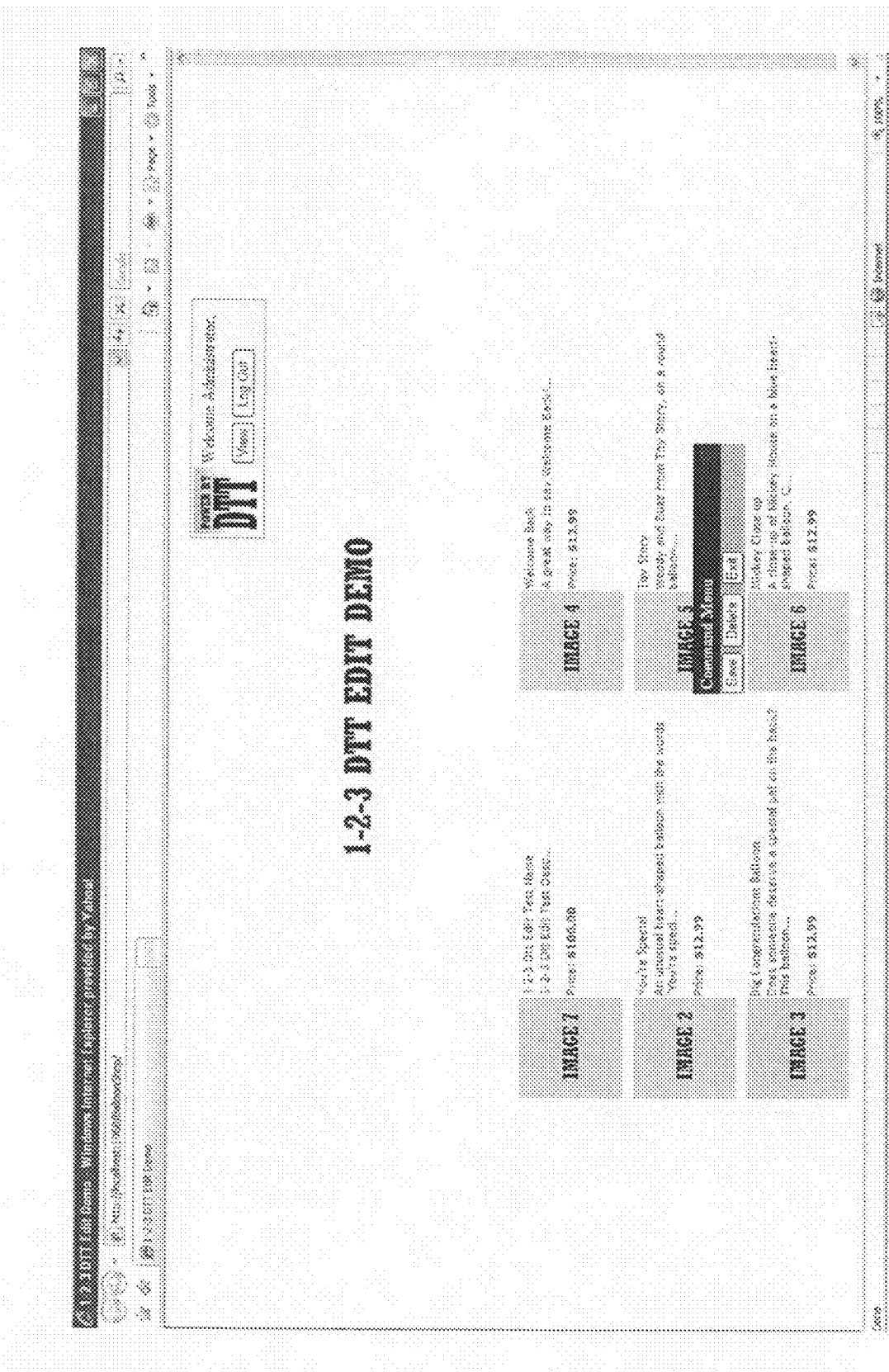
FIGURE 15C: NEW WEBCONTROL IS ADDED ON LIST ITEM WEB CONTROL.

1-2-3 DYNAMIC ON-TOP TABULAR (DTT) WEB PAGE EDITING

FIELD OF THE INVENTION

The present invention relates to the field of web pages. More specifically, the present invention relates to a method and system for editing web pages via the internet using Dynamic On-Top Tabular (DTT) to achieve a consistent look and feel to web pages in a quick and efficient manner.

BACKGROUND OF THE INVENTION

All web stores such as ebay.com and amazon.com offer customers the ability to browse and purchase products from their online stores. Most of these products are managed by a third party, the web store owners. The web store owners, if they wish to add, update, and customize the store merchants go to an admin web page using their web browser. These new updated information then will be stored to data storage. When customers browse the web store, data will be pulled from data storage and display on the web page. The web page view presented to the customers is different from the admin page view presented to the web store owners. However the admin pages actually carry the same content as the customers browse pages with some extra features that allow web store owners to edit the web store.

However, various web developers have developed some technology that allows web store owners to directly edit information on the customer's web pages using various look-and-feel popup dialogs (in this article, popup dialog, modal popup, or popup window is considered as popup generally.) The web store owners log on, the server after verifies the web store owner identification then it will populate the admin web page with the same view as the view when a customer browse the web store. The difference is the owner's page has the capability to edit displayed information. If the web store owners choose to edit the content of the page, the browser will display a distinct look-and-feel popup dialog with many various look-and-feels actions commands. The stores owners will enter new information into said distinct look-and-feel popup dialog, and then choose a relatively action that accommodate (or place) on said various look-and-feel dialogs with the new input data, and then submit it to the server. The server will populate the new data and post it back to the store owner's web page. The web owner browser will render the new information. This method solves the problem of having the two web pages for customers and web store owners in a traditional web stores. This is an advance technology compared to the old web editor technology. Wherein, the various look-and-feel popup dialogs do solve the web store owner and their customers view differences problem in traditional web stores. However, this is not an absolute solution for web page information editing.

Accordingly, there is a substantial need in the art for a faster and more efficient way to edit web pages or web controls (web control can be, but not limit, as user control) to improve the productivity and efficiency so that the web store owner can easily add, update, and customize their own online store to achieve a consistent look and feel.

Accordingly, there is a substantial need in the art for a better and more efficient way to edit web pages or web controls across all the edit dialogs without the need for various look-and-feel popup dialogs.

Additionally, there is a substantial need in the art to help web page owners achieve a consistent look across all the web pages without various look-and-feel dialogs.

Furthermore, there is a substantial need in the art to achieve consistent expression of the edit dialogs each time it is presented to the web store owner to improve productivity and efficiency and speed up the learning curve.

Currently, with Ajax technology along with it hover technology, some personal pages of Microsoft msn website allows a user or owner goes to edit each web page or web control on the same pages; however the way they does will extent the original area of the web control. In facts, some technology adds other label or text that is not supposed to be placed on said original area of the web control. The distortion of said original area of the web control will make said web controls lay out has to be carefully design at web page design time by the webmasters or programmers; otherwise, the change of the said original area of the said web control will effect the rest of the control, and change the look of the whole page.

Accordingly, there is a substantial need in the art to free a webmasters or programmer to design the page layout at the design time without worry of the distortion of said web page layout at the runtime.

Currently, even with said Ajax technology and its current use, if the editor does not switch between edit mode and view mode with by toggle explicitly, the editor may accidentally select an action that will unload the current edit page and upload another page according to said selected action. The outcome of the accident is numerous and unpredictable.

Accordingly, there is a substantial need in the art to allow the editor gracefully switching the edit and view mode explicitly within standard number of triggers. Said standard number of triggers guarantees said accident free.

Most websites on the internet has 3-tiers, the user interface tier, the business rule tier and data access tier.

The data access tier has access and manages their data using DBMS. DBMS is database management system software designed and engineered to manipulate the information in a database. It can add, delete, modify, sort, display and search for specific information. Traditionally DBMS stores data in records and each record can be view in tabular form expression. However, no one in the art has thought to use the DBMS tabular form expression for web page editing to help simplify the editing process.

In fact, since most mobile device have a small screen size, there is a need in the art for a command menu and the tabular form that can be easily displayed for viewing and editing.

Accordingly, there is a substantial need in the art for a way to edit data on web pages, wherein the data is viewed and stored in a tabular form.

Additionally, there is also a substantial need in the art for web store owners to use the tabular form modal popup to enter the new values for input fields on the DTT tabular form, and then they can simply either submit or cancel the process of loading new input field values into web control by single click.

Additionally, there is also a substantial need in the art for web store owners to be able view and display their web page as their customers do to achieve a consistent look and feel to the web page.

Additionally, there is a substantial need in the art for a way to edit data on web pages to improve productivity and efficiency.

Furthermore, there is also a substantial need in the art to simplify the process of editing information on web pages.

SUMMARY OF THE INVENTION

Accordingly, it is an object of this invention that web page layout has same look and feel for both viewer at view mode and page editor at edit mode. Web pages will become editable after a successful authorized log in by a user.

It is an object of this invention to combine Modal Popup, Hover, Tabular Form, and etc. . . . to provide a unique editing process of web pages with consistent look-and-feel and action flow.

It is an object of this invention that the process for editing select data can be done in 3 steps: First a user selects an action from said command menu regardless of how edit data will be displayed on said tabular form. Secondly, the user will fill in data on a tabular form, regardless of how update data will be display on said display item. And finally, the user can either save or exit update data on tabular to come back to the first step.

It is an object of this invention that said tabular form can occupy the whole or partial display screen.

It is an object of this invention that said the editor (web store owner) either submits or cancel the process of loading new input field values (in DTT form) into a web control by just one click.

It is an object of this invention that the expression of tabular form and data structure in data storage (DBMS) are the similar.

It is an object of this invention that said tabular form input fields can validate, or spell check, or format input for any input fields on Dynamic On-Top Tabular (DTT). However all expression will be displayed in tabular form.

It is an object of this invention to sort, categorize, but not limit, input fields Dynamic On-Top Tabular (DTT).

After an authorized user logs in to the web page, it is an object of this invention that the web page layout will have the same look and feel for both viewer at view mode and page editor at edit mode.

It is an object of this invention in one embodiment that a command menu be displayed when a user slides the cursor mouse icon over the selected item for editing.

It is a further object of this invention in another embodiment that a command menu be displayed when a user selects the web control for editing by touching a screen or panel, or scrolling to the desired item.

It is an object of this invention to provide an improved method and system that allows a user to maintain an overall consistency of the look of the web page for customers and their web store owners.

Accordingly, it is an object of this invention to provide an improved method and system that allows a user to maintain an overall consistency of the look of the web page for customers and their web store owners.

It is also an object of this invention to provide an improved method and system to edit web pages or web controls across all the edit dialogs.

Additionally, it is also an object of this invention to provide an improved method and system to help web page owners achieve a consistent look across all the edit dialogs.

It is also an object of this invention to provide an improved method and system to achieve consistent expression of the command menu and edit dialogs each time it is presented to the web store owner to improve productivity and efficiency and speed up the learning curve.

It is also an object of this invention to respect tabular form general expression. The general expression includes input fields, and commands to submit or cancel the process of loading new input field values entered.

It is also an object of this invention to provide an improved method and system to edit data on web pages, wherein the data is viewed and stored in a tabular form.

It is also an object of this invention to provide an improved method and system to be able view and display their web page as their customers do to achieve a consistent look and feel to the web page.

it is also an object of this invention to provide an improved method and system for simplify the process of editing information on web pages.

A still further object of the invention is to allow those who are responsible to a particular business, individual, or other party to control, manage, and easily modify both the content of the information in the web page.

Accordingly, there is a substantial need in the art for a better and more efficient way to edit web pages or web controls without said various look-and-feel popup dialogs.

An embodiment of the present invention provides a method and system for consistent look and feel edit process on web pages. The client system is provided with an identifier to identify that user. The client system display information that identifies the editing-data and display a command menu that a user is to perform to request to edit the data. In response to the indicated action being performed, the server will use with use the identifier to generate a tabular editor and a command option on said command menu and post back to the client machine. The client machine will render that tabular editor on top of the request-editing-web-page. The user now can edit new information using the tabular, after user done editing; user will click (or trigger) on the button to submit new information to server. As soon as client submit these new information value into web control, the engine server will lock a Dtt_lock, so that no other control is allow to enter the editing until the exit or action must be taken first. In a response to the user action, the server will store that new data in to data storage; the server then generates a webpage with new input data (values), reload the said command menu, and then post back to the client system. The client will render it on the current webpage.

On the DTT tabular form, the user will have to select a commit or cancel action to keep or remove the new information by an action of clicking one of the two buttons. After triggering these said actions, the control from the dynamic on-top tabular form will return to the web page. In a response of select action user perform, the client will send the request to the server. The server receives the request. According to request from the client system, the server will act upon that request. For example, in case of the Undo action, the previous value of in the web control is restored, and in case of the Save action, the server will save the new data as current data for that item in the web control. In both case, the server will generate a new html document and post it back to client with new input data as view data. The client system will render the new html document to the current web page. Any time, if the client wants to quit editing on a web control, he or her simply click the exit button.

It is an object of this invention with the tabular approach on how data being present on strategic DBMS to utilize that the same approach when editing data on web pages. For example, business information record (or entity) stored in data storage will be viewed as fields (or attributes) Business Name, Business Type, Business Address, Business Phone entities. The typical tabular form view includes field names and field values, and they are arranged in column(s) and row(s) in whichever way is easier to view by viewer. With Dynamic on-Top Tabular (DTT), the modal popup will also display with the same philosophy. To edit that business information, the web store owner must enter information for each field: Business Name, Business Type, Business Address and Business Phone. In conclusion, we will have DBMS capability on every of edit form.

1-2-3 DTT Edit with Dynamic On-Top Tabular invention is designed to solve current web editor's problems. Web store owner can have the same vision to the web page as their customers do thanks to 1-2-3 DTT Edit Tabular. 1-2-3 DTT Edit will simplify the process of editing information on web pages. The web store owner simply takes actions (which is consistent across the web pages) regardless the detail behind the actions, and then take a confirm action if needed. Dynamic On-Top Tabular framework will save the cost of developing and managing said various look-and-feel popup edit dialogs.

Yet another object of this invention is to capture various skill levels of individual people that are developing and managing web pages.

A still further object of the invention is to be a toolkit and/or web service.

In addition to the above objects, various other objects of this invention will be apparent from careful reading of this specification including the detailed description contained herein below.

BRIEF DESCRIPTION OF THE DRAWINGS

These as well as other features of the present invention will become apparent upon reference to the accompanying drawings wherein like numerals designate corresponding parts in the several figures, summarized as follows:

FIG. 1 is a block diagram illustrates an embodiment of the present invention.

FIG. 2 is a flow diagram illustrates the routine of entering 1-2-3 DTT edit mode starting by an authorized login.

FIG. 3 is a flow diagram illustrates the routine of actions of (pointing device) hover and trigger an action onto command menu.

FIG. 4 is a flow diagram illustrates routine of actions in response to an action taken from said command menu.

FIG. 5 is a flow diagram illustrates the routine of an action in response to either edit or add new request from said command menu.

FIG. 6 is a flow diagram illustrates the routine of actions presenting a dynamic on-top tabular form, and how data is entering on said dynamic on-top tabular form.

FIG. 7 is a flow diagram illustrates the routine of actions when adding a new item for list item web control.

FIG. 8 is a flow diagram illustrates the routine of actions onto said command menu without said dynamic on-top tabular form.

FIG. 9 is a flow diagram illustrates the routine of actions deleting an item from said list item web control.

FIG. 10 is a flow diagram illustrates the routine of action Undo from said command menu.

FIG. 11A illustrates edit web page in one embodiment in the view mode.

FIG. 11B illustrates edit web page in one embodiment at editing web control.

FIG. 11C illustrates edit web page in one embodiment at editing list item web control.

FIG. 11D illustrates a dynamic on-top tabular form for said web control on FIG. 11B in one embodiment at edit mode.

FIG. 11E illustrates a dynamic on-top tabular form for said list item web control on FIG. 11C in one embodiment at edit mode.

FIG. 12A illustrates in one embodiment commands in said command menu for web control.

FIG. 12B illustrates in one embodiment commands in said command menu for list item web control.

FIG. 13A illustrates application demo. In regular view mode (no DTT mode), command menu does not display when mouse hovers over a DTT-editable web control.

FIG. 13B illustrates application demo. An authorized login editor must log in to enter DTT edit.

FIG. 13C illustrates application demo. editor must provide a valid username and password to Log in.

FIG. 13D illustrates application demo. successful log in by authorized login editor.

FIG. 14A illustrates application demo. In edit mode, when mouse is over the editing web control, a command menu will be display.

FIG. 14B illustrates application demo. After the edit option on command menu is selected, adds form shows up and allows said editor to enter new data into tabular form fields.

FIG. 14C illustrates application demo. After new data is inputted, editing web control is displaying new data as current data FIG. 14D illustrates application demo. If undo change option selected, old data on editing web control is displayed as current data.

FIG. 14E illustrates application demo. On exit option is selected, client side pop up will be displayed to ask if said editor want to save the change or not.

FIG. 14F illustrates application demo. After save option (OK) is selected from client Side popup, web control displays new data as current data.

FIG. 14G illustrates application demo. If save option selected, new updated data is displayed current data.

FIG. 15A illustrates application demo. To add a new web control to list item web control, said editor must select Add new Option.

FIG. 15B illustrates application demo. To add a new web control item on list item Web Control by inputting new data to Tabular Form Fields.

FIG. 15C illustrates application demo. A New web control is added on list item web control.

Other features and advantages of the invention will become apparent from the following detailed description, taken in conjunction with the accompanying drawings, which illustrate, by way of example, various features of embodiments of the invention.

DETAILED DESCRIPTION OF THE INVENTION

The following detailed description and accompanying drawings are provided for purposes of illustrating and describing presently preferred embodiments of the present invention and are not intended to limit the scope of the invention in anyway. However, it will be recognized by one skilled in the art that various changes in the details, materials, arrangement of parts or operational conditions which have been herein described and illustrated in order to explain the nature of the invention maybe made or altered by those skilled in the art within the principles and scope of the invention or with equivalents thereof.

An embodiment of the present invention provides a method and system for easy-to-use and consistent constituent same look and feel across the page when the client is editing information on web pages. The 1-2-3 Dynamic on Top Tabular (DTT) Edit of the present invention simplify the learning curve when the user interact during they are editing the information in the control across the pages. Once the user have make change or entering information for one control, they can repeat the same approach for another control. Both lay out and actions are consistent across all controls and pages. When the client system is provided with an identifier to identify that user, The client system display information that identifies the editing-data and display said command menu that a user is about to perform to request to edit the data. In response to the indicated action being performed, the server will use with use the identifiers (client id, web page id, control id, and action type) to generate a suitable tabular editor and post back to the client machine. The client machine will render that tabular editor on top of the request-editing-web-page. The user now can edit new information using the tabular, after user done editing; user may confirm the change by click (or trigger) on the button on dynamic on-top tabular form to submit new information (values) to server. In a response to the user action, the server will store that new data in to data storage; the server then generates a webpage with new input data (values), and reloads said command menu, and then post back to the client system. The client will render it on the current webpage.

On the DTT tabular form, the user will have to select a commit (commit) or cancel action to keep or remove the new information by an action of clicking (or trigger) one of the two buttons. In a response of select action user perform, the client will send the request to the server. The server receives the request. According to request from the client system, the server will act upon that request. After triggering these said actions, the control from the dynamic on-top tabular form will return to the web page. At said web page, number next actions can be done when editor trigger a command (action) on said command menu. For example, in case of the Undo action, the server will remove the new data, reset the previous data as current generate an html document and post it back to client machine. The client system will render the new html to the current web page.

In another case, for example, the Save action on said command menu is triggered, the server will save the new data as current data, and generate a new html document and post it back to client with new input data as view data. The client system will render the new html document to the current web page.

The client can exit editing on a web control by trigger the exit action. As soon as the client quit editing the control, the Dtt_lock will be release immediately. 1-2-3 DTT edit approach can be repeatedly on any other web controls.

FIG. 1 is a block diagram illustrates an embodiment of the present invention. When the server receive the information, client id, control id, and action type from browser (system of 101, 102, 103, and 104), the server will store these information at server side into system of 109, and then the server engine (system of 107) at the server side will generate an suitable dynamic on top tabular form (system of 108) to let the user continue fulfill or complete their initial requested action. In the some simple case, the server engine simply show a very simple version of dynamic on top tabular message form to clarify the action (such as undo, redo, save, exit, and etc. . . . ) that user have taken. All the data have been changed during the editing will be preserve or store into the customer data base (system of 110) for later use. These change or updated information will be retrieve or view on the web site at view mode to be browsed.

FIG. 2 is a flow diagram illustrates the routine of entering 1-2-3 DTT Edit Mode from user log in. Session 201 is a process for user to log in. Session 202 verifies user status. Session 203 enables Toggle (a switch toggle between edit and view mode) and Edit mode. Session 204 is a process to determine if use chooses the invert the previous toggled mode. Session 205 is a process of invert toggle mode. Session 206 determines view or edit mode. Session 207 is a process of disable view mode. Session 208 is a process for user to enter command menu action handling, which will be explained in detail in FIG. 3. Session 209 is a process for user to log off. Session 212 is a process at view mode, disabling edit mode. Session 211 enables views of event handling.

FIG. 3 is a flow diagram illustrating the routine of actions onto command menu in response of moving a cursor and trigger by a pointing devices (such as mouse click.) Session 301 determines if a cursor is over on edit item. Session 302 is a process of showing command menu on that item. Session 303 is a process to determine if an action is triggered from that command menu.

FIG. 4 is a flow diagram illustrates routine of DTT Edit component in response to an action taken from command menu. At session 401, the component determines which action is requested. Session 402 determine if the request is to edit an existing item or to add a new item. Session 403 processes of display dynamic tabular edit form, the process will be explained in detail in FIG. 5. Session 404 is a process to find out if the request is delete list item web control or undo edit change. Session 409 is a process of DTT Edit component with out showing DTT form. This will be explained in detail in FIG. 8. Session 405 is a process to determine if to exit editing on select-to-edit web control. Session 406 is a process to determine if request from command menu is saving new data or edit data. Session 407 is a process of saving new data from selected-to-edit web control to DBMS. Session 408 release the Dtt_lock so user can edit other web control on web page.

FIG. 5 is a flow diagram illustrates the routine of DTT Edit in response to edit and to add new request from command menu. Session 501 determines if process is editing new item or adding new item to list. Session 502 process add new item, which will be explained in FIG. 7. Session 503 processes edit data of current item, which will be explained in FIG. 6.

FIG. 6 is a flow diagram illustrates the routine of Edit DTT at edit mode, explains session 503 in detail. Session 601 generate on top tabular with current data of edit item. Session 602 demonstrates actions of user of inputting new data. Session 603 is a process to determine action user's takes on dynamic tabular which is cancel edit tabular or submit new information. Session 604 populates current item with new input data. Session 605 lock a Dtt_lock (until Dtt_lock is released, the DTT Edit works on the current control) Session 606 is a process of posting html document back to client machine.

FIG. 7 is a flow diagram illustrates the routine of "Generate New DTT" adding item for list item web control, explains session 502 in detail. Session 701 is explained detail in FIG. 6. Session 702 is a process to generate to display list with new added item.

FIG. 8 is a flow diagram illustrates the routine of entering edit mode without showing dynamic on top tabular form. Session 801 determines if process is in delete mode, which user select to delete an item from list. Session 806 is a process processing delete mode, and release Dtt_Lock which will be explained in FIG. 9. Session 802 determines if process is in Undo action, when user selects to undo the change of new input data. Session 805 is a process of processing Undo, which will be explained in FIG. 10. Session 803 determines if process is in Exit mode. Session 804 Release Dtt_lock and activate Save action.

FIG. 9 is a flow diagram illustrates the routine of action delete on said command menu deleting an item from list item web control. Session 901 is a process of deleting item from list. Session 902 regenerates the display list item web control.

Session 903 generating new html document and post back to client's machine. Session 904 will release DTT_Lock.

FIG. 10 is a flow diagram illustrates the routine of action Undo on said command menu to Undo change make on the web control. Session 1001 is a process to set item data to previous data value. Session 1002 generate web control with previous data. Session 1003 post back html documents to client machine.

FIG. 11A is an illustration of an edit web page containing web controls in one embodiment before edit mode. FIG. 11B illustrates the edit web page in one embodiment at web control Edit DTT at edit mode. FIG. 11C illustrates the edit web page in one embodiment with list item web control Edit DTT at edit mode. FIG. 11D illustrates a dynamic on-top tabular form for item on FIG. 11B in one embodiment at edit mode. FIG. 11E illustrates DTT same look-and-feel said dynamic on-top tabular form list item web control on FIG. 11C in one embodiment at edit mode.

FIG. 12A illustrates in one embodiment commands in said command menu for web control. FIG. 12B illustrates in one embodiment commands in said command menu for list item web control.

Figure 14G:
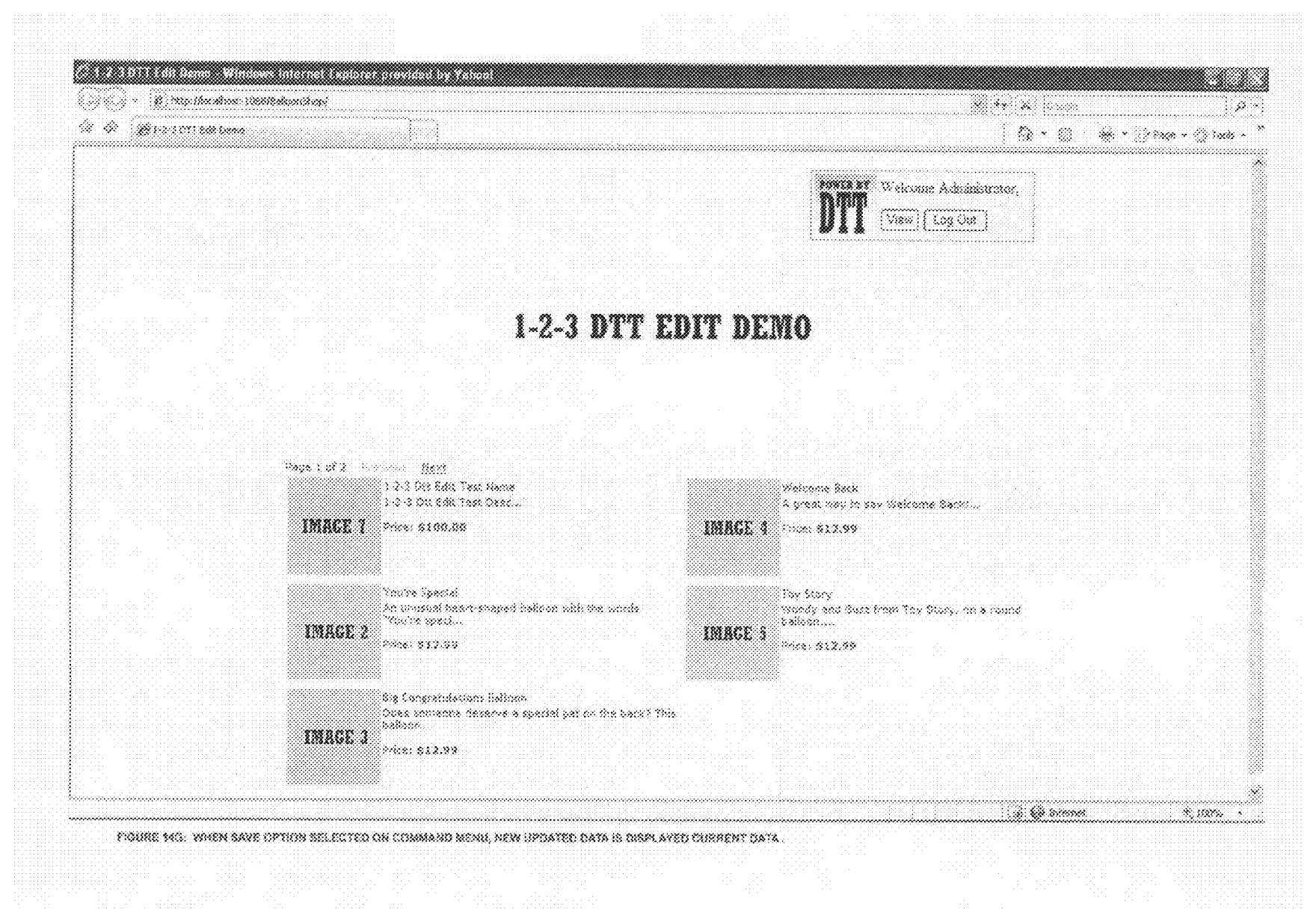

FIG. 13-FIG. 15 are screen shots of this invention. FIG. 13A illustrates application demo. In regular view mode (no DTT mode), command menu does not display when mouse hovers over a DTT-editable web control. FIG. 13B illustrates application demo. An authorized login editor must log in to enter DTT edit. FIG. 13C illustrates application demo. Editor must provide a valid username and password to Log in. FIG. 13D illustrates application demo. Successful log in by authorized login editor. FIG. 14A illustrates application demo. In edit mode, when mouse is over the editing web control, a command menu will be display. FIG. 14B illustrates application demo. After the edit option on command menu is selected, adds form shows up and allows said editor to enter new data into tabular form fields. FIG. 14C illustrates application demo. After new data is inputted, editing web control is displaying new data as current data. FIG. 14D illustrates application demo. If undo change option selected, old data on editing web control is displayed as current data. FIG. 14E illustrates application demo. On exit option is selected, client side pop up will be displayed to ask if said editor want to save the change or not. FIG. 14F illustrates application demo. After save option (OK) is selected from client Side popup, web control displays new data as current data. FIG. 14G illustrates application demo. If save option selected, new updated data is displayed current data. FIG. 15A illustrates application demo. To add a new web control to list item web control, said editor must select Add new Option. FIG. 15B illustrates application demo. To add a new web control item on list item Web Control by inputting new data to Tabular Form Fields. FIG. 15C illustrates application demo. A New web control is added on list item web control.

It is an object of this invention to have a method and system for user to consistent edit information on web pages, wherein the edit information request is sent from client to the server. The server receives the request including user identify and information web control Id, and a command option. The server system then send to the client system an edit panel including a submit button to edit the selected information. The client system receives, renders, and displays an edit panel in a consistent dynamic on-top tabular form format on browser. The user after edit the information, in response of a click (or trigger) of the button, the client will send to the server new data to request update the information. The server system receives the request associated with client id and web control Id, will store the new data in data storage in the server and generate to replace previous information with new edit information on selected-to-edit web control. The server then posts it back, and reloads the command menu. Depend on command (action) is triggered on the command menu; the client can take appropriate response. For example, the client can save new web control data (values), or to undo the previous web control data (values). Next, the server receives the request, according to the action request, the new data will be assigned as current display data when save action is requested, or it will be removed when Undo action is requested.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive; the scope of the invention being indicated by the appended claims, rather than the foregoing description, and all changes which come within the meaning and range of equivalency of the claims are therefore intended to be embraced therein.

What is claimed is:

1. A system for editing information on a web page, comprising:
 a web page;
 a web control of said web page;
 a client system for viewing said web page;
 a client side Popup of said web page;
 a command menu of said web control;
 selecting an option from said command menu;
 a tabular form for data entry for said selected option;
 a server system for handling tabular editing process;
 one or more data storages for handling data inputted and previewed;
 a lock that forces a user to edit only one web control at a time;
 said lock mechanism is used for locking or releasing an edit mode of said web control;
 wherein said lock is in locked mode, only said web user control is allow to be edited; and
 wherein said lock is in released mode, then all said web controls are available for editing;
 wherein an edit option is selected from a viewable said command menu of said web control, said tabular form is generated and displayed on top of said web page for editing old data of said web control;
 wherein a user inputs new data into said tabular form, said user will then select either cancel or submit from command menu on said tabular form;
 wherein said user selects cancel from command menu on said tabular form, said user will return back to said web page;
 wherein said user selects submit option from command menu on said tabular form, said server will put that new data into said data storage, said server will then generate a preview display of said web control with new inputted data, said server then will set said lock to locked mode, said server then set said command menu to viewable, said server then generate a new html document to post back onto said client system, and then said client system will render new html document to said web page;
 wherein said user will the select either Save, Undo, or Exit option from said command menu on said web control;
 wherein said user selects Undo option from said command menu on said web control, said server will save the old data as current data for the said web control, said server will generate a new html document to post to client system, said client system will render the new html document to said web page;

wherein said user will then select Save option from said command menu on said web control, said server will save the preview data as current data into the said web control, said server will then set said lock to released mode, said server then set the said command menu to non viewable, said server system will generate a new html document and post back onto said client system, and then said client system will render the new html document to said web page;

wherein said user selects Exit option from said command menu on said web control, Said web page will display a said client side Popup to with Yes and No options;

wherein said user selects Yes command from said client side Popup, said server will save the preview data as current data into the said web control, said server will then set said lock to released mode, said server then sets the said command menu to non viewable, said server system will generate a new html document and post back onto said client system, and then said client system will render the new html document to said web page;

wherein said user selects No on said client side popup, said server will save the old data as current data for the said web control, said server will then set said lock to released mode, said server then sets said command menu to non viewable, said server will generate a new html document to post to client system, and then said client system will render the new html document to said web page; and wherein said user elects to make additional changes to said web page, said process is repeated by starting again at command menu of said web control.

2. The system for editing information on a web page of claim 1, wherein said command menu has the following options: Edit, Delete, Save, Undo, and Exit.

3. The system for editing information on a web page of claim 1, wherein said command menu has the ability to be viewable or non viewable on said web page.

4. The system for editing information on a web page of claim 1, where in said command menu is initially displayed by a user sliding a cursor mouse icon over said web control.

5. The system for editing information on web page of claim 1, where in said command menu is initially displayed by user touching a screen over said web control for editing.

6. The system for editing information on web page of claim 1, where in said command menu is initially displayed by user scrolling over said web control for editing.

7. The system for editing information on web page of claim 1, where in said command menu is initially displayed by user depressing key on a key pad for editing.

8. The system for editing information on a web page of claim 1, wherein said command menu option is triggered by a user clicking a mouse button when cursor is positioning over said command menu for editing.

9. The system for editing information on a web page of claim 1, wherein said command menu option is triggered by a user touching a screen over said command menu for editing.

10. The system for editing information on a web page of claim 1, wherein said command menu option is triggered by a user scrolling over said command menu for editing.

11. The system for editing information on web page of claim 1 wherein said command menu option is triggered by a user by user depressing key on a key pad for editing.

12. The system for editing information on a web page of claim 1, wherein said web page contains one or more web controls.

13. A system for editing information on a web page, comprising:

a web page;

a web control of said web page;

a client system for viewing said web page;

a client side Popup of said web page;

a command menu of said web control;

selecting an option from said command menu;

a lock mechanism, which forces a user to edit only one web control at a time;

a tabular form for data entry for said selected option;

a server system for handling a tabular editing process;

a data storages for handling data inputted and previewed;

wherein an edit option is selected from a viewable said command menu of said web control, said tabular form is generated and displayed on top of said web page for editing old data of said web control;

wherein a user inputs new data into said tabular form, said user will then select either cancel or submit from command menu on said tabular form;

wherein said user selects cancel from command menu on said tabular form, said user will return back to said web page;

wherein said user selects submit option from command menu on said tabular form, said server will put that new data into said data storage, said server will then generate a preview display of said web control with new inputted data, said server then will set said lock to locked mode, said server then set said command menu to viewable, said server then generate a new html document to post back onto said client system, and then said client system will render new html document to said web page;

wherein said user will the select either Save, Undo, or Exit option from said command menu on said web control;

wherein said user selects Undo option from said command menu on said web control, said server will save the old data as current data for the said web control, said server will generate a new html document to post to client system, said client system will render the new html document to said web page;

wherein said user will then select Save option from said command menu on said web control, said server will save the preview data as current data into the said web control, said server will then set said lock to released mode, said server then set the said command menu to non viewable, said server system will generate a new html document and post back onto said client system, and then said client system will render the new html document to said web page;

wherein said user selects Exit option from said command menu on said web control, Said web page will display a said client side Popup to with Yes and No options;

wherein said user selects Yes command from said client side Popup, said server will save the preview data as current data into the said web control, said server will then set said lock to released mode, said server then sets the said command menu to non viewable, said server system will generate a new html document and post back onto said client system, and then said client system will render the new html document to said web page;

wherein said user selects No on said client side popup, said server will save the old data as current data for the said web control, said server will then set said lock to released mode, said server then sets said command menu to non viewable, said server will generate a new html document to post to client system, and then said client system will render the new html document to said web page; and wherein said user elects to make additional changes to said web page, said process is repeated by starting again at command menu of said web control.

14. The system for editing information on a web page of claim 13, wherein said command menu has the following options: Edit, Delete, Save, Undo, and Exit.

15. The system for editing information on a web page of claim 13, wherein said web page contains one or more web controls.

* * * * *